United States Patent
Morehead et al.

(10) Patent No.: US 11,667,051 B2
(45) Date of Patent: Jun. 6, 2023

(54) PUNCH ASSEMBLIES AND TOOLLESS SYSTEMS THEREOF FOR TIP RETENTION AND RELEASE

(71) Applicant: Wilson Tool International Inc., White Bear Lake, MN (US)

(72) Inventors: John H. Morehead, White Bear Lake, MN (US); Anthony David Schwartz, Forest Lake, MN (US); Kevin Andrew Johnston, Deer Park, WI (US)

(73) Assignee: Wilson Tool International Inc., White Bear Lake, MN (US)

( * ) Notice: Subject to any disclaimer, the term of this patent is extended or adjusted under 35 U.S.C. 154(b) by 107 days.

(21) Appl. No.: 17/030,326

(22) Filed: Sep. 23, 2020

(65) Prior Publication Data
US 2022/0088818 A1 Mar. 24, 2022

(51) Int. Cl.
*B26F 1/14* (2006.01)
(52) U.S. Cl.
CPC ..................................... *B26F 1/14* (2013.01)
(58) Field of Classification Search
CPC ........................................................ B26F 1/14
See application file for complete search history.

(56) References Cited

U.S. PATENT DOCUMENTS

| | | | |
|---|---|---|---|
| 199,715 A | 1/1878 | Jenkins | |
| 1,116,617 A * | 11/1914 | Page | E05C 1/065 292/DIG. 31 |
| 1,179,476 A * | 4/1916 | Thomas | B21D 28/34 279/83 |
| 1,383,414 A * | 7/1921 | Mansell | F16B 39/32 411/297 |
| 1,386,259 A | 8/1921 | Jourdan et al. | |
| 1,569,136 A | 1/1926 | Pardee, Jr. | |
| 1,726,012 A | 8/1929 | Fredrick | |
| 1,784,911 A | 12/1930 | Schlitters, Jr. et al. | |
| 1,806,694 A | 5/1931 | Markson | |
| 1,910,275 A | 5/1933 | Alden | |
| 1,979,059 A | 10/1934 | Wallman | |
| 2,107,581 A | 2/1938 | Parsons et al. | |
| 2,245,676 A | 6/1941 | Johnson | |
| 2,323,755 A | 7/1943 | Smith | |
| 2,431,566 A * | 11/1947 | Kopczynski | B21D 28/34 83/698.31 |

(Continued)

FOREIGN PATENT DOCUMENTS

| | | |
|---|---|---|
| CN | 1176855 A | 3/1998 |
| CN | 1360537 A | 7/2002 |

(Continued)

OTHER PUBLICATIONS

PCT International Search Report and Written Opinion dated Jan. 10, 2022 for PCT/US2021/050786 filed Sep. 17, 2021, 12 pages.

*Primary Examiner* — Sean M Michalski
(74) *Attorney, Agent, or Firm* — Fredrikson & Byron, P.A.

(57) ABSTRACT

Punch assembly that enable selective securement and release of punch tips to a punch body (or holder) of the assemblies, wherein various retain/release systems can be used with the punch body, specifically relative to triggering mechanisms of such systems and their functioning and use with ancillary components relative to securing and releasing the punch tip, without adversely affecting long-term efficiency and effectiveness of the assemblies.

28 Claims, 25 Drawing Sheets

(56) References Cited

U.S. PATENT DOCUMENTS

| | | | |
|---|---|---|---|
| 2,448,817 A | 9/1948 | Warren | |
| 2,522,440 A | 9/1950 | Freter | |
| 2,613,974 A * | 10/1952 | Llewhellin | E05C 19/145 292/256 |
| 2,614,781 A | 10/1952 | Engel | |
| 2,805,866 A | 9/1957 | Amend | |
| 2,893,291 A | 7/1959 | Hollis | |
| 2,927,432 A | 3/1960 | Parry | |
| 2,934,370 A * | 4/1960 | Love | E05C 1/065 292/142 |
| 2,955,831 A | 10/1960 | Zandberg et al. | |
| 2,974,967 A | 3/1961 | Felmet | |
| 3,114,280 A * | 12/1963 | Schott | B21D 28/24 83/588 |
| 3,211,035 A * | 10/1965 | Whistler, Sr. | B21D 45/006 83/139 |
| 3,278,133 A * | 10/1966 | Froehlich | G11B 15/662 403/368 |
| 3,289,519 A | 12/1966 | Piccone | |
| 3,447,455 A | 6/1969 | Shneider | |
| 3,495,493 A | 2/1970 | Herb et al. | |
| 3,530,750 A | 9/1970 | Daniels | |
| 3,548,700 A * | 12/1970 | Herzog | B21D 28/34 83/698.91 |
| 3,600,999 A | 8/1971 | Daniels | |
| 3,641,860 A | 2/1972 | Whistler, Sr. et al. | |
| 3,735,993 A | 5/1973 | Seibert | |
| 3,763,730 A | 10/1973 | Ahlegian | |
| 4,092,888 A | 6/1978 | Wilson | |
| 4,146,239 A * | 3/1979 | Martin | B23B 31/1072 29/26 A |
| 4,174,648 A | 11/1979 | Wallis | |
| 4,273,015 A | 6/1981 | Johnson | |
| 4,377,292 A | 3/1983 | Staron | |
| 4,446,767 A | 5/1984 | Wilson | |
| 4,503,741 A | 3/1985 | Hunter et al. | |
| 4,526,077 A | 7/1985 | Deguvera | |
| 4,688,459 A * | 8/1987 | Osborn | B21D 28/36 279/97 |
| 4,718,161 A | 1/1988 | Pfister et al. | |
| 4,762,043 A | 8/1988 | Sneed | |
| 4,850,755 A | 7/1989 | Spencer | |
| 4,989,484 A | 2/1991 | Johnson et al. | |
| 5,020,407 A | 6/1991 | Brinlee | |
| 5,044,244 A | 9/1991 | Olson | |
| 5,131,303 A | 7/1992 | Wilson et al. | |
| 5,271,303 A | 12/1993 | Chatham | |
| 5,301,580 A * | 4/1994 | Rosene | B21D 45/006 83/136 |
| 5,329,835 A | 7/1994 | Timp et al. | |
| 5,647,256 A | 7/1997 | Schneider | |
| 5,746,104 A | 5/1998 | Russell et al. | |
| 5,752,424 A | 5/1998 | Rosene et al. | |
| 5,832,798 A * | 11/1998 | Schneider | B26F 1/14 83/698.11 |
| 5,839,341 A | 11/1998 | Johnson et al. | |
| 5,884,546 A * | 3/1999 | Johnson | B21D 28/34 83/140 |
| 5,887,502 A | 3/1999 | Yamaguchi et al. | |
| 5,934,165 A * | 8/1999 | Chatham | B21D 28/12 83/699.41 |
| 6,047,621 A | 4/2000 | Dries et al. | |
| 6,082,516 A | 7/2000 | Willer | |
| 6,142,052 A | 11/2000 | Endo | |
| 6,155,154 A * | 12/2000 | Hsu | B26D 7/2635 83/508.3 |
| 6,196,103 B1 | 3/2001 | Schneider et al. | |
| 6,276,247 B1 | 8/2001 | Helda | |
| 6,334,381 B1 | 1/2002 | Chatham | |
| 6,463,838 B2 * | 10/2002 | Hsu | B26D 7/2621 83/508.3 |
| 6,463,839 B2 * | 10/2002 | Ohtsuka | B21D 45/08 83/698.91 |
| 6,725,756 B2 | 4/2004 | Brenneke | |
| 6,782,787 B2 | 8/2004 | Morehead et al. | |
| 6,895,797 B2 | 5/2005 | Lowry et al. | |
| 6,895,849 B2 | 5/2005 | Rosene et al. | |
| 6,910,694 B2 * | 6/2005 | Hartmann | B24B 45/006 403/321 |
| 6,953,197 B2 * | 10/2005 | Hartmann | B27B 5/32 403/321 |
| 7,051,635 B2 | 5/2006 | Morehead | |
| 7,069,765 B2 | 7/2006 | Grove et al. | |
| 7,156,009 B2 | 1/2007 | Iwamoto et al. | |
| 7,159,426 B1 | 1/2007 | Ghiran | |
| 7,168,356 B2 | 1/2007 | Rosene et al. | |
| 7,658,134 B2 * | 2/2010 | Morgan | B21D 28/34 83/140 |
| 7,802,506 B2 | 9/2010 | Endo | |
| 7,900,543 B2 | 3/2011 | Ikeda et al. | |
| 7,926,399 B2 | 4/2011 | Huang et al. | |
| 7,975,587 B2 | 7/2011 | Schneider | |
| 8,327,745 B2 | 12/2012 | Lee et al. | |
| D690,332 S | 9/2013 | Morehead et al. | |
| D690,333 S | 9/2013 | Morehead et al. | |
| 8,707,841 B2 | 3/2014 | Morehead et al. | |
| 8,714,065 B2 | 5/2014 | Takahashi et al. | |
| 9,409,223 B2 | 8/2016 | Morehead et al. | |
| 9,687,994 B2 | 6/2017 | Lee et al. | |
| 9,718,109 B2 | 8/2017 | Morehead et al. | |
| 9,776,337 B2 | 10/2017 | Lee et al. | |
| 2003/0075034 A1 | 4/2003 | Brenneke | |
| 2004/0200333 A1 | 10/2004 | Seeley et al. | |
| 2006/0060046 A1 | 3/2006 | Sugizaki et al. | |
| 2006/0277970 A1 | 12/2006 | Pabich et al. | |
| 2007/0068352 A1 | 3/2007 | Morgan | |
| 2009/0173204 A1 | 7/2009 | Malvestiti et al. | |
| 2010/0107832 A1 * | 5/2010 | Johnston | B21D 45/006 83/13 |
| 2010/0180744 A1 | 7/2010 | Nordlin | |
| 2010/0206150 A1 | 8/2010 | Kraft et al. | |
| 2011/0072948 A1 | 3/2011 | Belyan et al. | |
| 2011/0232107 A1 * | 9/2011 | da Graca | B23D 49/167 83/698.31 |
| 2013/0139667 A1 | 6/2013 | Lee et al. | |
| 2013/0199352 A1 * | 8/2013 | Thielges | B21D 28/34 83/684 |
| 2013/0340588 A1 | 12/2013 | Qi | |
| 2014/0331842 A1 | 11/2014 | Morehead et al. | |
| 2016/0332319 A1 | 11/2016 | Lee et al. | |
| 2016/0339502 A1 | 11/2016 | Morehead et al. | |
| 2021/0039153 A1 * | 2/2021 | Siemen | B21D 28/343 |

FOREIGN PATENT DOCUMENTS

| | | |
|---|---|---|
| CN | 1972767 A | 5/2007 |
| CN | 201127968 Y | 10/2008 |
| CN | 101791653 A | 8/2010 |
| CN | 102271835 A | 12/2011 |
| DE | 1777363 A1 | 12/1972 |
| FR | 2641486 A1 | 7/1990 |
| JP | S54059594 U | 4/1979 |
| JP | S55129517 U | 9/1980 |
| JP | S55055877 Y2 | 12/1980 |
| JP | S57003443 U | 1/1982 |
| JP | S57189625 U | 12/1982 |
| JP | S5823221 U | 2/1983 |
| JP | S59089626 U | 6/1984 |
| JP | S61022698 U | 2/1986 |
| JP | S64054923 U | 4/1989 |
| JP | H05192717 A | 8/1993 |
| JP | H09174162 A | 7/1997 |
| JP | H10244327 A | 9/1998 |
| JP | 3037168 B2 | 4/2000 |
| JP | 2001137970 A | 5/2001 |
| JP | 2002011531 A | 1/2002 |
| JP | 2004500242 A | 1/2004 |
| JP | 2006150392 A | 6/2006 |
| JP | 2007136463 A | 6/2007 |
| MX | 2011004886 A | 5/2011 |

(56) References Cited

FOREIGN PATENT DOCUMENTS

| | | |
|---|---|---|
| WO | 2004060620 A2 | 7/2004 |
| WO | 2010053895 A1 | 5/2010 |
| WO | 2013070536 A1 | 5/2013 |

* cited by examiner

PUNCH ASSEMBLIES AND TOOLLESS SYSTEMS THEREOF FOR TIP RETENTION AND RELEASE

TECHNICAL FIELD

The present invention pertains to punch assemblies and more particularly to various systems used therewith for selectively retaining and releasing a punch tip therefrom.

BACKGROUND

Punch presses are typically configured to hold a plurality of tools for forming a variety of shapes and sizes of indentations and/or holes in sheet workpieces, e.g., formed of sheet metal. Tools of this sort commonly include at least one punch assembly and corresponding die. In a multiple station turret punch press, a rotatable turret is often used for holding a plurality of punch assemblies above a workpiece support surface, while a corresponding plurality of die-receiving frames are located below the workpiece support surface. In some cases, once a first tool set has been used, it is exchanged for a second tool set, and then a third, and so on. In some cases, the machine tool includes an elongated rail for storing the tool set in cartridges. The cartridges, for example, can be slidably engaged with the rail such that they can be slid back and forth to and from the mounting position. Once a first workpiece has been fully processed using the desired sequence of tool sets, a second workpiece may be processed, in some cases beginning again with the first tool set.

Conventional punch assemblies have been known to include a punch body (or holder) and a punch tip. To that end, some punch assemblies have been designed to further function with a punch guide. In general, the punch body and tip are slidably engaged within the punch guide for reciprocal movement along a central longitudinal axis of the punch guide. Such punch assembly (and corresponding die) is mounted in a press and located in a working position of the press, e.g., beneath the ram (or integrally connected to the ram). As such, when downward force is provided on the ram, the punch tip end is correspondingly driven outward from the punch guide and through an opening in a stripper plate, in order to contact and form an indentation or a hole through a sheet workpiece (with use of corresponding die). The stripper plate, which is attached to an end of the punch guide, prevents the workpiece from following the punch tip, upon its retraction, back into the punch guide.

With some punch assemblies, the punch body and tip are integrally formed together. However, more and more designs are being configured with tips that can be releasably attached to the punch bodies. Those skilled in the art understand that punch assemblies require regular maintenance and modification, and these functions can be performed more efficiently if using a punch assembly with releasable tip (as opposed to a one-piece punch assembly). For example, one can quickly swap a punch tip needing to be sharpened or replaced due to wear, with another tip that is ready for use. As a result, there can be reduced downtime for the tool as well as reduced delay for corresponding work job(s). Moreover, the punch bodies (for such designs with releasable tips) can be found to have significantly increased lifetimes and enhanced versatility. Particularly, while the punch tips may need to be replaced (or retired), the punch body can be subsequently used with new punch tips. Moreover, these new tips used with the punch body can be similar or different in terms of type and/or size.

While punch assemblies with releasable punch tips can be efficient designs, as described above, the designs need to be effectively configured as well. Particularly, when attached to the punch bodies, the tips need to be sufficiently seated. Skilled artisans would understand that without proper seating, corresponding use of the punch assemblies can be compromised. In some cases, proper seating can be impacted by the design of the tip retain/release system. One aspect often included in such systems is a triggering mechanism. To that end, some designs dictate that the mechanism not only serves as a trigger for tip release but also serves as a support for the tip when retained by the punch body. Alternately or in combination, some designs dictate external tools to be used with such mechanism, while some designs dictate use of multiple mechanisms. These and other design aspects can influence the punch assembly's effectiveness (or performance) over its life. For example, the assembly's level of performance during use could decline over time simply due to shortcomings with the overall design. Conversely, such performance level can be maintained over time, yet with substantial cost or complexity relative to the assembly's design.

Embodiments of the invention are focused on addressing the above-noted issues and others.

SUMMARY

Embodiments of the invention relate to punch assemblies enabling selective securement and release of punch tips to punch bodies (or holders) of the assemblies. Other embodiments of the invention relate to punch bodies of such punch assemblies, as well as retain/release systems used with such punch bodies. Further embodiments of the invention are concerned with triggering mechanisms of such retain/release systems, particularly their functioning in such systems and use with ancillary components relative to securing and releasing the punch tip. One focus is providing punch assembly designs with tip release/retain systems that are particularly favorable in certain respects and enhance efficiency and effectiveness of the assemblies.

In some embodiments, a punch body is provided. The punch body comprises a sidewall that defines a central cavity, and the central cavity extends along a longitudinal extent of the punch body. The punch body further comprises a retain/release system that includes a triggering mechanism, a coupling mechanism, and a resilient member. The triggering mechanism is accessible on the punch body sidewall and hand adjustable relative to the sidewall. The triggering mechanism couples the punch body and the coupling mechanism. The resilient member opposes adjustment of the triggering mechanism. In event of hand force being applied to the triggering mechanism, the coupling mechanism is correspondingly shifted from a first position within the punch body central cavity to a second position corresponding to an unlocked configuration of the punch body with respect to a punch tip. The resilient member shifts the coupling mechanism to the first position with removal of the hand force, and said first position corresponds to a locked configuration of the punch body with respect to a punch tip.

In additional embodiments, a punch body is provided and comprises a sidewall that defines a central cavity, the central cavity extending along a longitudinal extent of the punch body. The punch body further comprises a retain/release system including a triggering mechanism, a coupling mechanism, and a resilient member. The triggering mechanism is accessible on the punch body sidewall and is hand adjustable relative to the sidewall. The triggering mechanism couples the punch body and the coupling mechanism, and the resilient member is within the punch body central cavity underneath the coupling mechanism. The triggering mechanism has an arm portion and a protruding portion. The arm portion is configured to receive one or more finger forces, which when applied correspond with the protruding portion shifting the coupling mechanism. The arm portion in a first position corresponds with the coupling mechanism being in a shallower position within the punch body central cavity corresponding to a locked configuration of the punch body with respect to a punch tip. The arm portion in a second position corresponds with the coupling mechanism being in a deeper position within the punch body central cavity corresponding to an unlocked configuration of the punch body with respect to a punch tip.

In further embodiments, a method of securing a punch tip with a punch body is provided. The method comprises a step of providing a punch body, the punch body having a sidewall that defines a central cavity extending along a longitudinal extent of the punch body. The punch body comprises a retain/release system including a triggering mechanism, a coupling mechanism, and a resilient member. The coupling mechanism is seated within the punch body central cavity, and the triggering mechanism couples the punch body and the coupling mechanism. An additional step is readying the punch body so a punch tip can be joined thereto. Another step is shifting the coupling mechanism to a position corresponding to a locked configuration of the punch body.

Other features and benefits that characterize embodiments of the present invention will be apparent upon reading the following detailed description and review of the associated drawings.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1AA is a perspective view of punch assembly similar in design to that shown in FIG. 1A yet provided in a second station configuration in accordance with certain embodiments of the invention.

FIG. 1BB is a side cross-sectional view of the punch assembly of FIG. 1AA, taken along the line 1BB-1BB, in accordance with certain embodiments of the invention.

FIG. 1CC is the punch assembly of FIG. 1AA, shown in exploded assembly view in accordance with certain embodiments of the invention.

FIG. 1DD is same view of the punch assembly shown in FIG. 1BB, with triggering mechanism in actuated position in accordance with certain embodiments of the invention.

FIG. 2AA is a perspective view of punch assembly similar in design to that shown in FIG. 2A yet provided in a second station configuration in accordance with certain embodiments of the invention.

FIG. 2BB is a side cross-sectional view of the punch assembly of FIG. 2AA, taken along the line 2BB-2BB, in accordance with certain embodiments of the invention.

FIG. 2CC is the punch assembly of FIG. 2AA, shown in exploded assembly view in accordance with certain embodiments of the invention.

FIG. 2DD is same view of the punch assembly shown in FIG. 2BB, with triggering mechanism in actuated position in accordance with certain embodiments of the invention.

FIG. 3AA is a perspective view of punch assembly similar in design to that shown in FIG. 3A yet provided in a second station configuration in accordance with certain embodiments of the invention.

FIG. 3BB is a side cross-sectional view of the punch assembly of FIG. 3AA, taken along the line 3BB-3BB, in accordance with certain embodiments of the invention.

FIG. 3CC is the punch assembly of FIG. 3AA, shown in exploded assembly view in accordance with certain embodiments of the invention.

FIG. 3DD is same view of the punch assembly shown in FIG. 3BB, with triggering mechanism shown in an intermediate position in accordance with certain embodiments of the invention.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. Examples of constructions, materials and dimensions are provided for selected elements, and all other elements employ that which is known to those of skill in the field of the invention. Those skilled in the art will recognize that many of the examples provided have suitable alternatives that can be utilized.

The punch assemblies embodied herein exhibit certain efficiencies, such as shorter downtimes for the punch assembly in the event of punch tip maintenance/modification and longer lifetimes for the punch body. However, the embodied punch assemblies further include tip retain/release systems that have favorable design aspects, as described herein. For example, triggering mechanisms for these systems have designs that are relatively non-complex and easy to use. To that end, the embodied retain and release systems are configured to enhance both the effectiveness and efficiency of the punch assemblies.

Figure 1A:
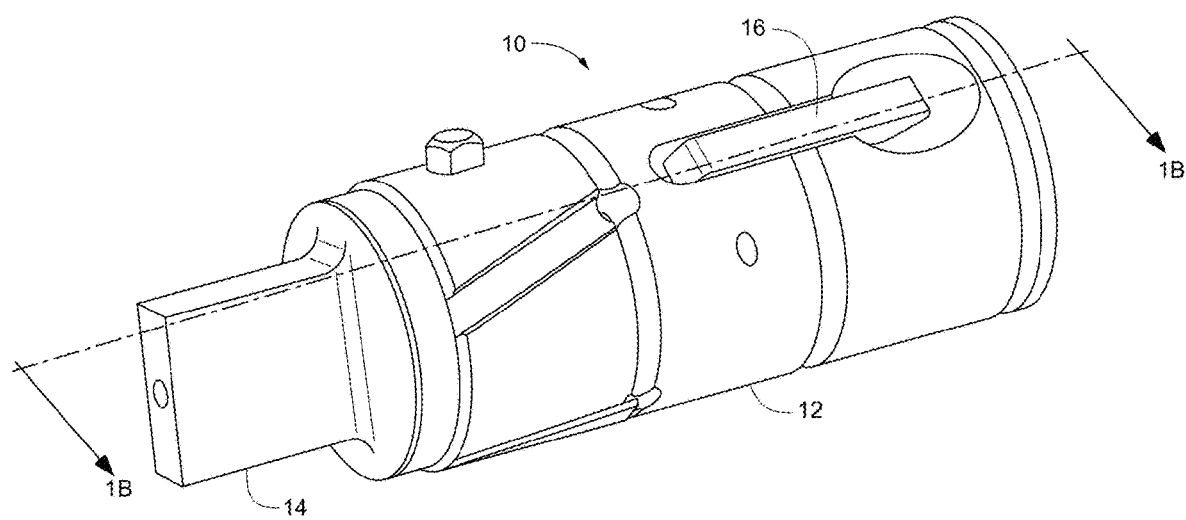
FIG. 1A is a perspective view of a punch assembly design provided in a first station configuration in accordance with certain embodiments of the invention.

FIG. 1A shows a perspective view of a punch assembly 10 provided in a first station configuration (commonly known as "B" station) according to certain embodiments of the invention. To that end, while certain station configurations are depicted in the drawings, these are merely exemplary for the embodied punch assemblies, and the invention should not be limited to such. Further, while illustrated neither for this assembly 10 nor for the other punch assemblies embodied herein, the skilled artisan would understand that punch guides are often used with punch assemblies in their set-ups for machining processes. In brief, the punch guide generally forms a tube-shaped channel, within which the punch assembly is held when not in use and in part driven out of when used in performing a machining process. Such punch guides generally include a spring pack (or driver) assembly coupled to a first end of the guide and a stripper plate coupled to a second, opposing end of the guide. To that end, the skilled artisan would appreciate that the punch assemblies embodied herein could be used with a wide variety of punch guide designs and corresponding spring pack assemblies and stripper plates therefor, as desired.

Shifting back to FIG. 1A, the punch assembly 10 is shown to include a punch body 12 and punch tip 14. As has been described, the punch body 12 is configured to selectively retain or release the punch tip 14, and one component of the retain and release system which is used to actuate either securement or release of the tip 14 relative to the body 12 is a triggering mechanism 16. To that end, the mechanism 16 is operably coupled to the punch body 12, yet its coupling allows the mechanism 16 to be selectively moved relative to the punch body 12 and, via such movement, the mechanism 16 brings about condition for retaining or releasing the punch tip 14 relative to the punch body 12.

Figure 1B:
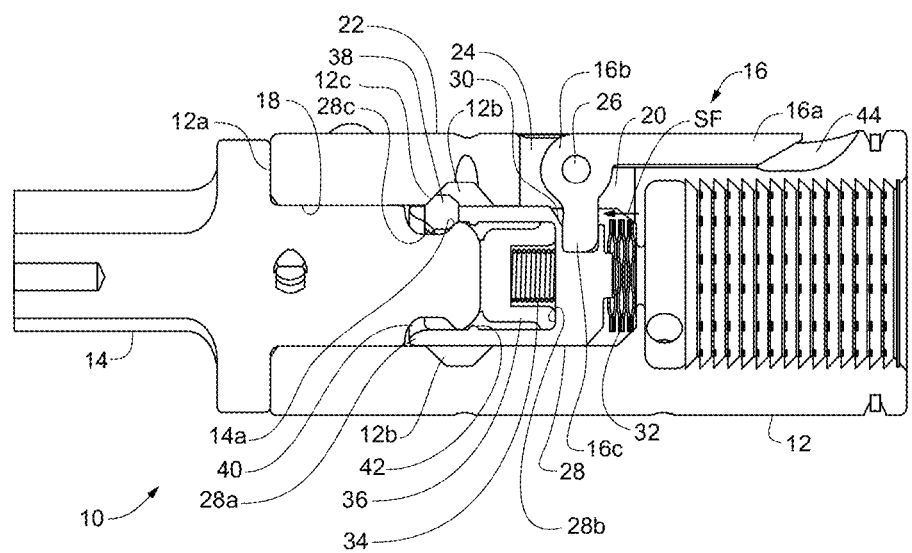
FIG. 1B is a side cross-sectional view of the punch assembly of FIG. 1A, taken along the line 1B-1B, in accordance with certain embodiments of the invention.
Figure 1C:
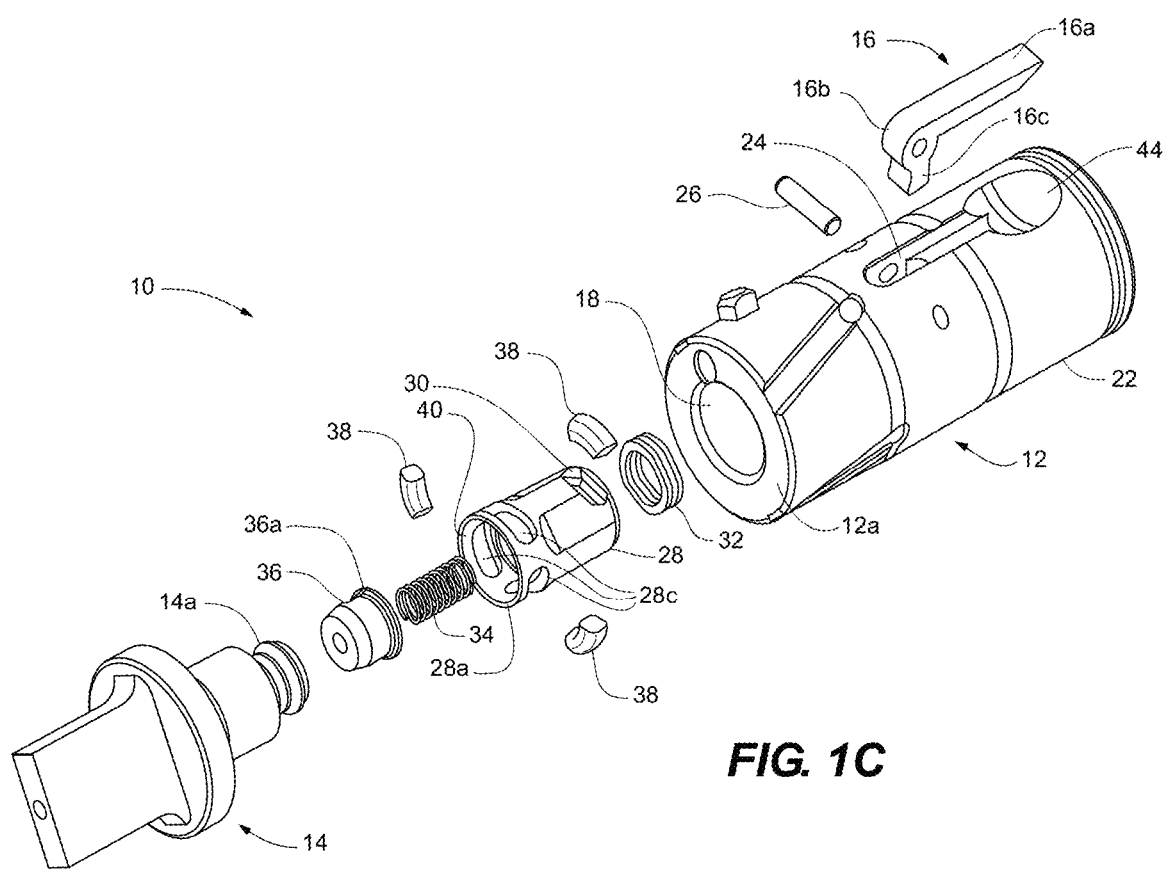
FIG. 1C is the punch assembly of FIG. 1A, shown in exploded assembly view in accordance with certain embodiments of the invention.

Continuing with the triggering mechanism 16, focus is shifted to FIGS. 1B and 1C, which illustrate cross sectional and exploded assembly views, respectively, of the punch assembly 10. As shown, the punch body 12 has a sidewall 22 that defines a central cavity 18 within which the punch tip 14 is secured to the body 12. The triggering mechanism 16, as shown, is configured to pass through an opening 20 in the punch body sidewall 22, and as such extend into the central cavity 18 of the punch body 12. As shown, in certain embodiments, the punch body sidewall 22 is defined with a channel 24 sized to hold the triggering mechanism 16, with the channel 24 further defining the opening 20, which fluidly communicates with the punch body central cavity 18. In certain embodiments as shown, the channel 24 is sized for the triggering mechanism 16 to be recessed therein when in its "non-actuated" position, as illustrated in FIGS. 1A and 1B. Consequently, by keeping the mechanism 16 within the channel 24 (and thus not affecting the punch body's profile), the punch assembly 10 is better equipped for use with punch guides, as needed. Particularly, when the assembly 10 is used within a punch guide, the recessed triggering mechanism 16 (as well as other triggering mechanisms embodied herein) is restricted from moving from its "non-actuated" position (and correspondingly the punch body 12 from its "locked" configuration) due to the surrounding wall of the punch guide. To that end (and as will be more fully understood from the description/drawings), restricting actuation of the triggering mechanism 16 consequently prevents accidental punch tip release, which is crucial during machining operations.

The triggering mechanism 16 is uniquely, yet simply shaped so that when the mechanism 16 is moved, actuation of other ancillary components of the retain/release system can be initiated. In continuing with the triggering mechanism 16 and in certain embodiments as shown, it is formed as a single, integral piece that is operably coupled to the punch body sidewall 22. For example, as shown relative to FIGS. 1B, 1C, and 1D, the triggering mechanism 16 is shaped as a lever, having arm portion 16a, elbow portion 16b, and protruding portion 16c. To that end, the elbow portion 16b is operably coupled to the punch body sidewall 22, e.g., via pin 26, such that the mechanism 16 is selectively rotatable about the pin 26 and relative to the punch body 12. As shown, the triggering mechanism 16 is coupled to the punch body sidewall 22 (with the arm portion 16a correspondingly oriented) to run parallel to a longitudinal axis A (see FIG. 1D) of the punch body 14. In designs including the channel 24 described above (defined in the punch body sidewall 22), in certain embodiments, the channel's length can also be correspondingly defined to extend parallel to the longitudinal axis A.

Another ancillary component of the retain/release system can involve a coupling mechanism held within the punch body 12 and directly linked to the triggering mechanism 16. In certain embodiments as shown, the coupling mechanism can include a carrier body 28. Said carrier body 28, with reference to FIGS. 1B and 1C, is inserted in the punch body central cavity 18 and is defined with a sidewall bore 30 that is configured to align with the opening 20 in the sidewall 22 of the punch body 12. As such, when inserted in the channel 24, the triggering mechanism 16 (and particularly, its protruding portion 16c) is configured to further pass through the opening 20 and into the carrier body bore 30. As later described, this coupling of the carrier body 28 with the triggering mechanism 16 enables corresponding movement of the body 28 from movement of the mechanism 16. As will be further detailed, other ancillary components enabling the punch tip 14 to be alternately secured or released from the punch body 12 can include one or more of the following: resilient member(s) (e.g., springs 32 and/or 34), a cap 36, and a plurality of wedge members 38.

Figure 1D:
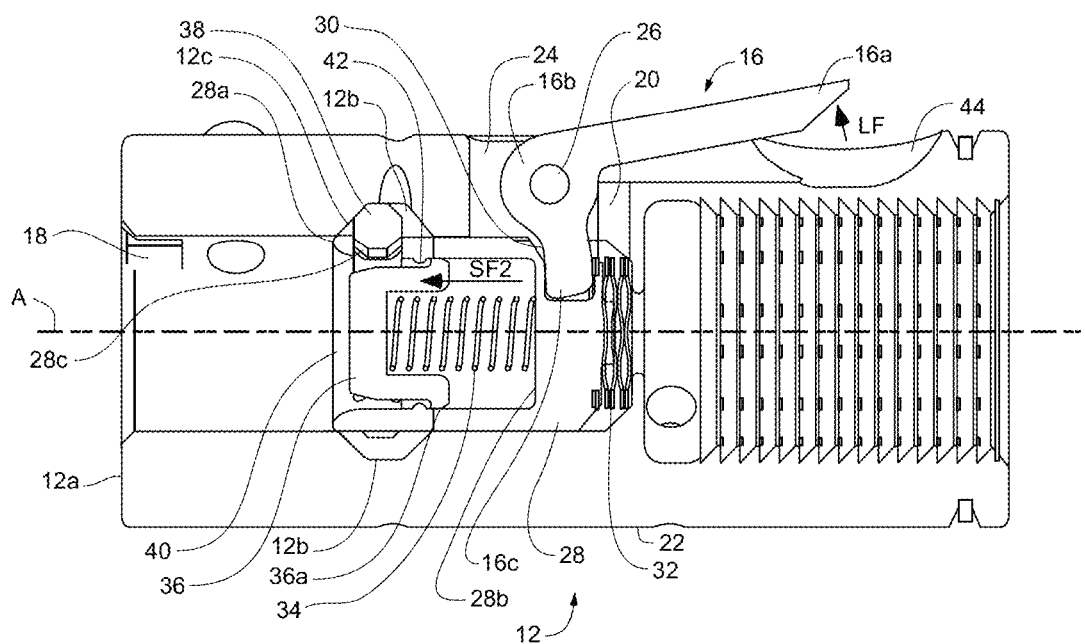
FIG. 1D is same view of the punch assembly shown in FIG. 1B, yet only illustrating a punch body thereof and triggering mechanism in actuated position in accordance with certain embodiments of the invention.
Figure 1A:
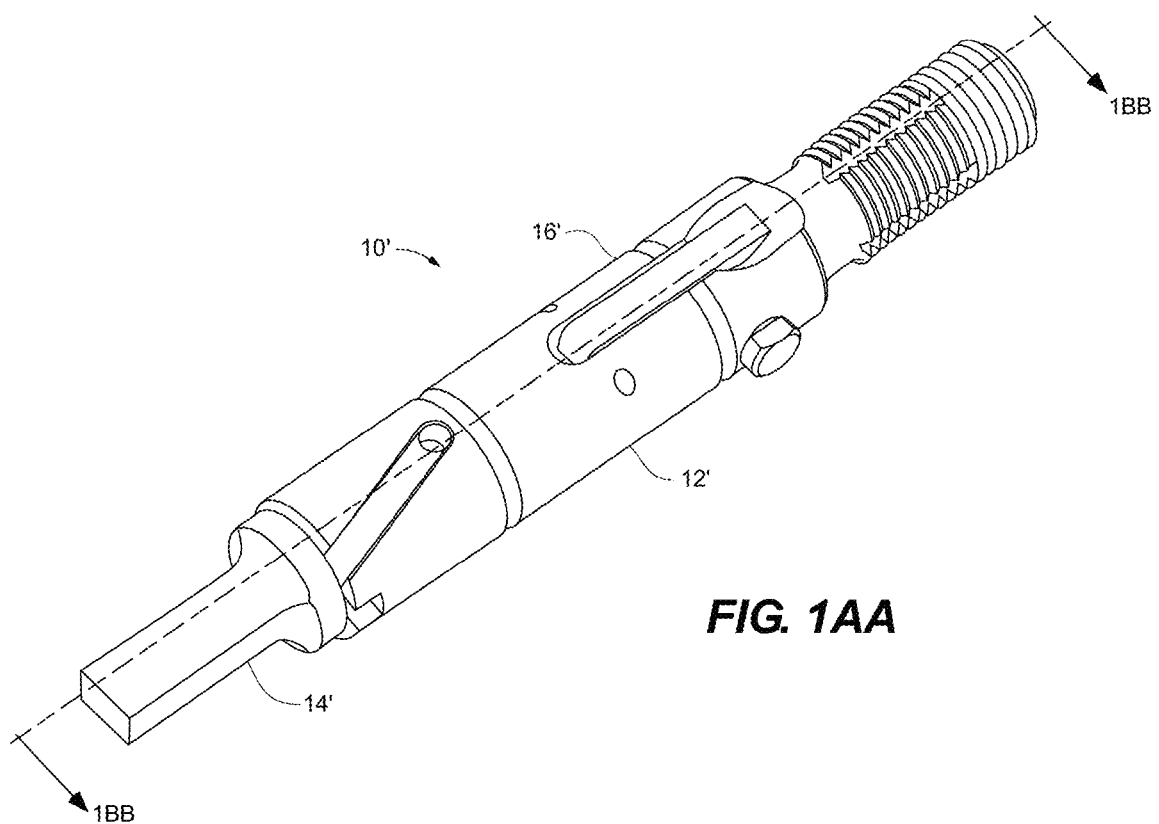
Figure 1B:
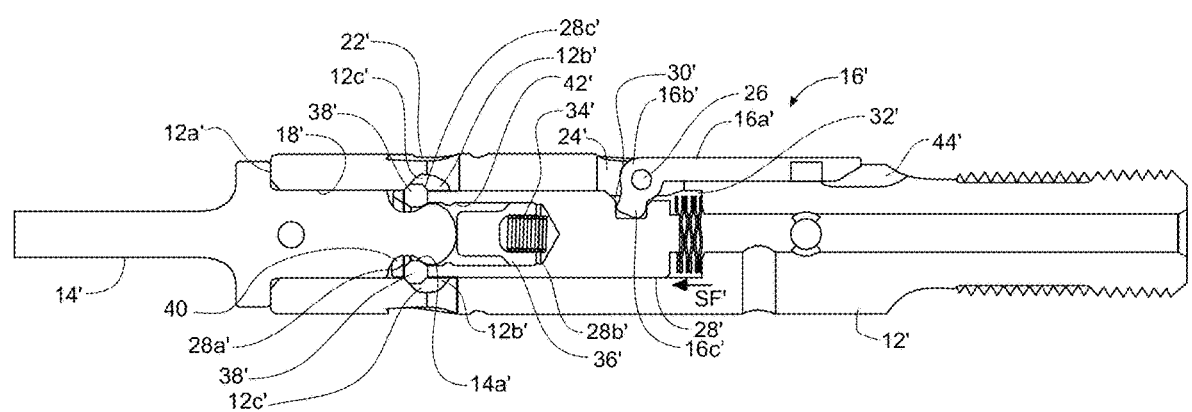
Figure 1C:
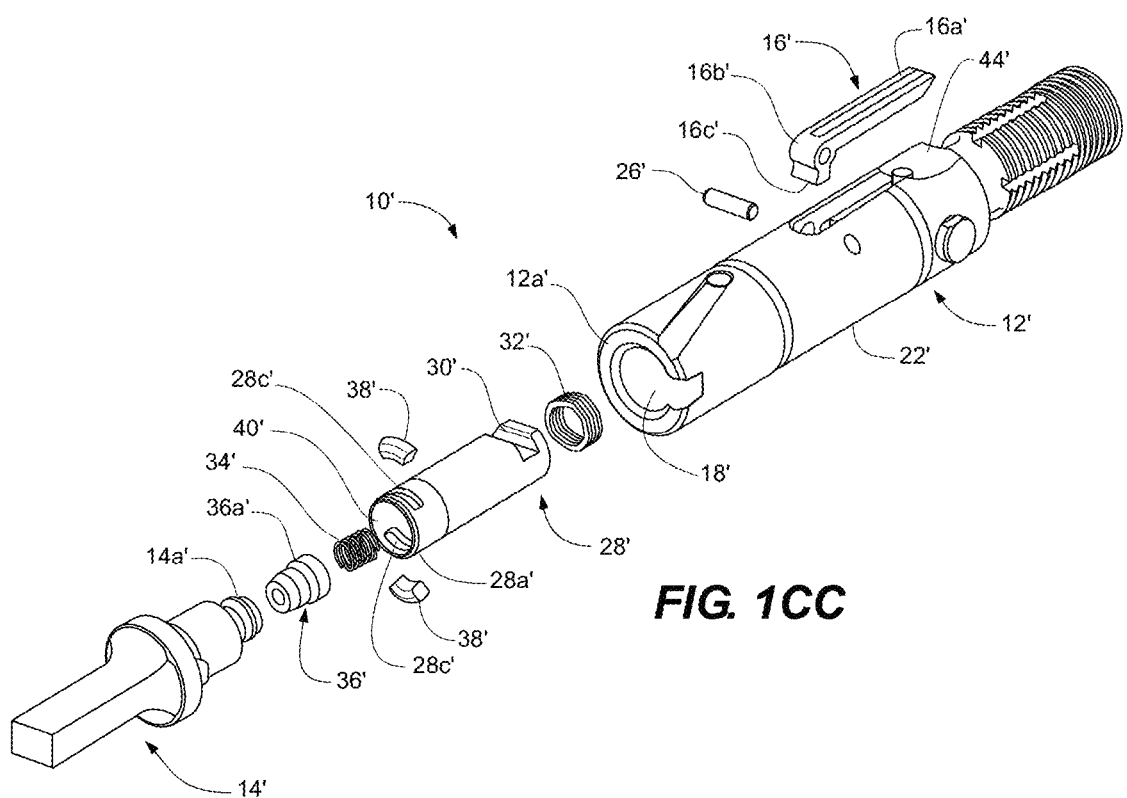
Figure 1D:
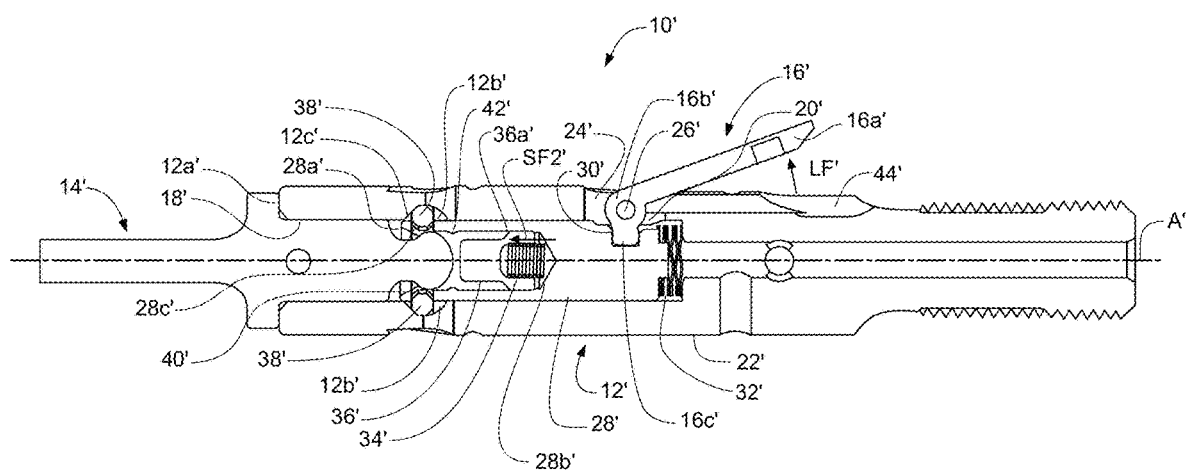

With reference to FIGS. 1B, 1C, and 1D, a first resilient member, e.g., spring 32, is positioned underneath the carrier body 28 in the central cavity 18 of the punch body 12. Consequently, as shown in 1B, the spring 32 causes the carrier body 28 to be resiliently biased in an outward direction with respect to the punch body cavity 18 (i.e., toward a front end 12a of the punch body 12). However, as described above, subsequent linkage of the triggering mechanism 16 with the carrier body 28 (via protruding portion 16c inserted in carrier body sidewall bore 30) prevents the carrier body 28 from being further forced outward relative to the punch body cavity 18 by the spring 32. To that end, movement of the carrier body 28 is dictated via movement of the triggering mechanism 16 (and correspondingly movement of the protruding portion 16c). In particular, as the arm portion 16a of the triggering mechanism 16 is lifted (at end opposite the elbow portion 16b), the protruding portion 16c is correspondingly pivoted inward relative to the punch body central cavity 18, such that the body 28 is correspondingly urged away from the front end 12a of the punch body 12 and to a deeper position in the cavity 18. Such deeper positioning of the carrier body 28 is perhaps best demonstrated in FIG. 1D, representing an "unlocked" (or "release") configuration for the punch body 12 relative to the punch tip 14. Conversely, as the triggering mechanism 16 is released (whereby the arm portion 16a is pulled back toward the punch body sidewall 22 via action of spring 32 on the carrier body 28), the protruding portion 16c is pivoted outward relative to the punch body central cavity 18. Correspondingly, the carrier body 28 is moved toward the front end 12a of the punch body 12 and to a shallower position in the punch body cavity 18. Such shallower positioning of the carrier body 28 is perhaps best demonstrated in FIG. 1B, representing a "locked" (or "retain") configuration for the punch body 12 relative to the punch tip 14. With the above as a backdrop, it should be appreciated why the triggering mechanism 16 is positioned parallel with the longitudinal axis A of the punch body 12, as levered movement of the mechanism 16 in line with that axis A enables corresponding movement of the carrier body 28 along that axis A.

In certain embodiments (and with further reference to FIGS. 1B and 1C), a further resilient body, e.g., spring 34, and cap 36 are configured with the carrier body 28. For example, as shown in FIG. 1B, the spring 34 is positioned in a central cavity 40 of the carrier body 28, with the spring 34 in turn covered by the cap 36 in the cavity 40. Accordingly, the spring 34 resiliently biases the cap 36 in an outward direction with respect to the carrier body 28 (i.e., toward the front end 28a of the body 28). In certain embodiments, as shown, an inner protrusion 42 is provided (e.g., an outward extension on the inner surface) within the central cavity 40 of the carrier body 28. It should be appreciated that such protrusion 42 can be integrally defined and formed as part of the carrier body 28; however, in certain embodiments, the protrusion can also be provided as a ring gasket that is seated in a circular channel in the central cavity 40. Such protrusion 42, via its extension into the cavity 40, prevents the cap 36 from being forced too far from the floor 28b of the carrier body 28 via action of the spring 34. In certain embodiments as shown, an outer edge 36a of the cap 36, when contacting the protrusion 42, prevents further outward movement of the cap 36 within the central cavity 40 of the carrier body 28. Aside from the inner protrusion 42, movement of the cap 36 is further dictated via movement of the carrier body 28 and corresponding movement of the wedge members 38, as will be detailed.

In summary, the triggering mechanism 16 is configured for its arm portion 16a to be lifted relative to the punch body sidewall 22 to actuate ancillary components of the retain/release system and provide an "unlocked" (or "release") condition for the punch body 12. It should be appreciated that the lifting action of the arm portion 16a is a toolless action, i.e., meaning no tool is required. To that end, the action can be easily performed, e.g., with a single finger of a user, with the arm portion 16a to be directed in single direction, i.e., in an outward direction relative to the punch body sidewall 22. In certain embodiments, as shown, the sidewall 22 is defined with a recess 44 to house the end of the arm portion 16a to be acted on and within which a person may insert a fingertip to scoop and lift the arm portion 16a. As further detailed below (and with reference to FIGS. 1B and 1C), the alternating movement (or positioning) of the carrier body 28 corresponds with securing or releasing the punch tip 14 with respect to the punch body 12.

While alternate movements of the arm portion 16a correspondingly trigger opposing movements of the carrier body 28 within the punch body cavity 18, the carrier body 28 is configured to function with a plurality of wedge members 38 in securing or releasing the punch tip 14 with respect to the punch body 12. To that end, and with reference to FIGS. 1B, 1C, and 1D, the wedge members 38 are positioned to align between a corresponding plurality of openings 28c in the carrier body 28 and groove 12b defined within the sidewall 22 of the punch body 12 (lying outer to the openings 28c) to correspondingly accommodate the members 38. In certain embodiments, at least three wedge members 38 are used, and the groove 12b is defined to be continuous around the inner surface of the sidewall 22. In certain embodiments, as shown, the openings 28c are at the front end 28a of the carrier body 28, and the openings 28c are defined equidistant about the circumference of the body's outer surface. As further detailed below (with continued reference to FIGS. 1B and 1D), movement of the carrier body 28 (via movement of the arm portion 16a) results in the wedge members 38 being correspondingly moved relative to the carrier body openings 28c and the groove 12b in the punch body 12.

For example, starting with FIG. 1B, the punch body 12 is shown with the punch tip 14 secured thereto. To that end, and as illustrated, the triggering mechanism 16 is in its "non-actuated" position, which corresponds with the punch body 12 being in a "locked" configuration relative to the punch tip 14. In certain embodiments, as shown, the arm portion 16a is in contact with the punch body sidewall 22 when the triggering mechanism 16 is in its "non-actuated" position, and the arm portion 16a is driven into such contact with the sidewall 22 via force SF from the spring 32 on the carrier body 28. Particularly, the spring force SF resiliently biases the triggering mechanism 16 to counteract lifting force LF applied to arm portion 16a (see FIG. 1D), so that, without lifting force LF being applied, the punch body 12 remains in the "locked" configuration. As an aside, and by way of comparison, some retain/release systems use tools to actuate their triggering mechanisms, and correspondingly change the punch body configuration from "locked" configuration to "unlocked" configuration (and vice versa). One reason for this can be to ensure the punch body staying in its "locked" configuration relative to punch tip. However, with the resilient biasing of the triggering mechanism 16 via the spring force SF (FIG. 1B), there is a level of securement provided so that the punch body 12 remains in the "locked" configuration unless the arm portion 16a is intentionally lifted.

Continuing with FIG. 1B, in certain embodiments, the arm portion 16a extends generally parallel to the longitudinal axis A of the punch body 12 (FIG. 1D) when in the "non-actuated" position. The angled relationship between the protruding portion 16c and the arm portion 16a (e.g., about) 90° enables the mechanism 16 to contact and hold the carrier body 28 within the punch body central cavity 18; however, the spring force SF urges the body 28 to its shallowest position in the punch body central cavity 18. In such position of the carrier body 28, the wedge members 38, as shown, are locked within the carrier body openings 28c between hub 14a of the punch tip 14 and walls 12c of inner groove 12b of the punch body sidewall 22. As an aside, and by way of comparison, some retain/release systems use their triggering mechanisms to not only trigger conditions for retaining or releasing punch tips, but the mechanisms are also used to secure and seat the punch tips to the punch bodies. One reason for this can be to reduce the quantity of parts used with (and corresponding cost of) the punch assembly. However, this type of design can sometimes prove detrimental to the punch assembly over time, given the substantial impact forces continually transferred to the triggering mechanism during use of the assembly. With the punch assembly 10 using particular components for securing and seating the punch tip 14 (such as the carrier body 28 and wedge members 38), whereby the triggering mechanism 16 is linked to the punch tip 14 in indirect fashion, there are aspects of separation in the designs relative to the triggering and seating functions, so as to limit potential crossover effects that can significantly impact the punch assembly's performance over its life.

Shifting to FIG. 1D, lifting force LF has been applied to the arm portion 16a of the triggering mechanism 16. Accordingly, the protruding portion 16c of the mechanism 16 is inwardly pivoted relative to the punch body central cavity 18, and via its contact with the carrier body 28, the body 28 is correspondingly urged inward relative to the cavity 18. This inward positioning of the body 28 (while opposed by the spring force SF of the spring 32) correspondingly directs the carrier body openings 28c to align with deeper portions of the groove 12b of the punch body sidewall 22. Accordingly, greater portions of the wedge members 38 are permitted to move from the carrier body openings 28c and into the groove 12b. While such movement of the wedge members 38 is illustrated in FIG. 1D (in comparison to that depicted in FIG. 1B), it shows the punch tip 14 as missing, i.e., having already been released from the punch body 12. Particularly, with the wedge members 38 able to slide into deeper portions of the groove 12b, the further spring 34 and cap 36 can accelerate the process of the punch tip 14 being released. Particularly, spring force SF2 from the spring 34, and corresponding contact directed from the cap 38 onto the punch tip hub 14a, forces the hub 14a out from the carrier body 28 and correspondingly causes the wedge members 38 to slide into the deeper portions of the groove 12b. As further illustrated, the cap 36 is forced toward the front end 28a of the carrier body 28, and as already described, the cap 36 can be held via contact with the inner protrusion 42. In such case, this positioning of the cap 36 correspondingly suspends the wedge members 38 within the openings 28c and the groove 12b with the punch tip 14 removed.

To subsequently join and seat the punch tip 14 to the punch body 12, the user simply inserts the punch tip hub 14a back into the carrier body central cavity 40 without any action needing to be levied on the triggering mechanism 16. In certain embodiments, the hub 14a is inserted past the wedge members 38 until contacting the inner protrusion 42 in the cavity 40. Providing sufficient inward force on the punch tip 14, and in turn its hub 14a, correspondingly shifts the carrier body 28 further into the cavity 40, and against the spring 32. In certain embodiments, such inward force needs to be greater than the spring force SF of the spring 32. From that already described, it should be appreciated that with the spring 32 being compressed, the triggering mechanism 16 is correspondingly lifted outward into its "actuated" position (via the linkage between the carrier body 28 and the protruding portion 16c of the mechanism 16). To that end, a subsequent release of the inward force on the punch tip 14 results in the triggering mechanism 16 rotating back to its "non-actuated" position (given the spring force SF of the spring 32 acting on the carrier body 28 and the protruding portion 16c), and the carrier body 28 would shift back to its shallower position in the punch body central cavity 18. Correspondingly, the wedge members 38 would be shifted out from the deeper portions of the groove 12b (via contact with surrounding walls of the carrier body 28 defining the openings 28c) and correspondingly shift back to their positions in the carrier body openings 28c and groove 12b as shown in FIG. 1B. As an aside, and by way of comparison, some retain/release systems employ multiple triggering mechanisms to trigger conditions for retaining or releasing punch tips. This type of design can perhaps divide any impact forces transferred to the triggering mechanisms during use of the assembly. However, keeping the triggering mechanism 16 indirectly linked to the punch tip 14, as described above, preserves the securing and seating functions, and thus the performance, of the punch body 12 over its life, while also keeping the design easy to use and being relatively non-complex in configuration.

FIGS. 1AA-1DD, as referenced above, pertain to embodiments of a punch assembly 10' that is similar in design to the assembly 10 shown in FIGS. 1A-1D yet is provided in a second station configuration (commonly known as "A" station). As will be recognized, due to the different assemblies but also based on the design similarities, the reference numerals in FIGS. 1AA-1DD are provided as next iterations of the elements used in FIGS. 1A-1D. Regarding principal differences between the punch assemblies 10 and 10', the punch assembly 10' has a longer extent, which correspondingly increases the extents of many of its elements, including the punch body 12' and tip 14', the triggering mechanism 16', particularly its arm portion 16a', as well as the carrier body 28' and the cap 36'. Further, in certain embodiments as shown, the protruding portion 16c' of the mechanism 16' is at a greater angle (e.g., about 120°) from the arm portion 16a'. Such increased angle provides greater lever force on the carrier body 28' (and against the spring 32) when the LF' is applied to the triggering mechanism 16', which is of value with the longer design of the assembly 10'. Also, the punch assembly 10' has a thinner profile, such that the quantity of wedge members 38' can be lessened (to quantity of two) while still providing effective securing and seating functions of the punch body 12' relative to the punch tip 14'. Additionally, the catch 36a' for the cap 36' (to hold the cap 36' to the carrier body 28') is located about midway up the cap's side wall (as opposed to bottom edge 36 for cap 36), in order to keep the cap 36' within the carrier body 28' via contact with the inner protrusion 42'. Finally, in FIG. 1DD, the punch tip 14' is shown as still being mounted to the punch body 12'. However, based on the illustrated outward shifting of the wedge members 38' within deeper portions of the groove 12b' (and given the outward movement of the triggering mechanism 16' and the deeper positioning of the carrier body 28' within the punch body central cavity 18'), the skilled artisan would appreciate that the punch tip 14' is about to be driven from the punch body 12' via contact from the cap 36 due to spring force SF2' from the spring 34'.

Figure 2A:
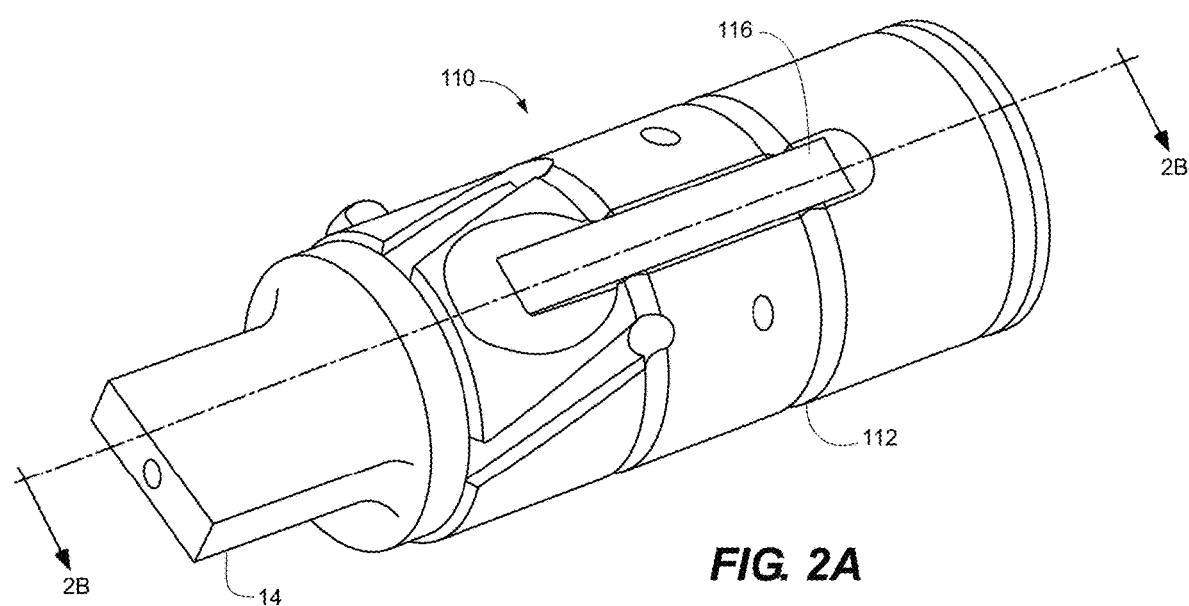
FIG. 2A is a perspective view of another punch assembly design provided in a first station configuration in accordance with certain embodiments of the invention.

FIG. 2A shows a perspective view of another punch assembly 110 provided in a "B" station configuration according to certain embodiments of the invention. Like the punch assembly 10 of FIG. 1A, the punch assembly 110 is shown to include a punch body 112 with a triggering mechanism 116 used to actuate either securement or release of punch tip 14 relative to the body 112. To that end, the punch assembly 110 has similar features (with similar functions) to those already described for the punch assembly 10 of FIG. 1. For example, like the mechanism 16 of FIG. 1A, the mechanism 116 is operably coupled to the punch body 112, yet its coupling allows the mechanism 116 to be selectively moved relative to the punch body 112 and, via such movement, the mechanism 116 brings about condition for retaining or releasing the punch tip 14 relative to the punch body 112.

Figure 2B:
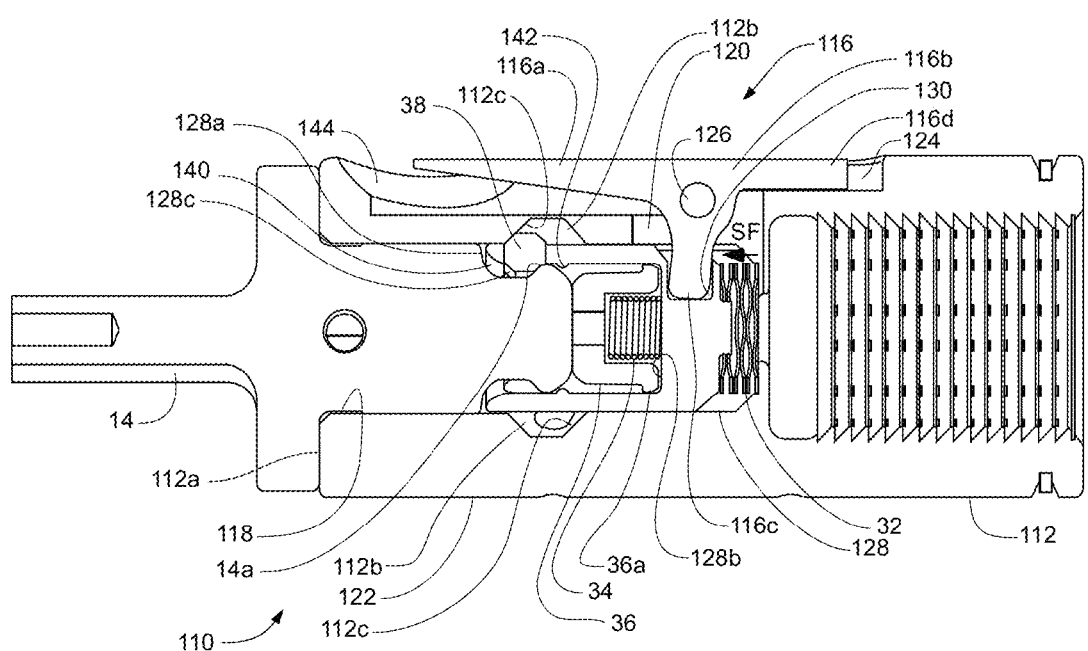
FIG. 2B is a side cross-sectional view of the punch assembly of FIG. 2A, taken along the line 2B-2B, in accordance with certain embodiments of the invention.
Figure 2C:
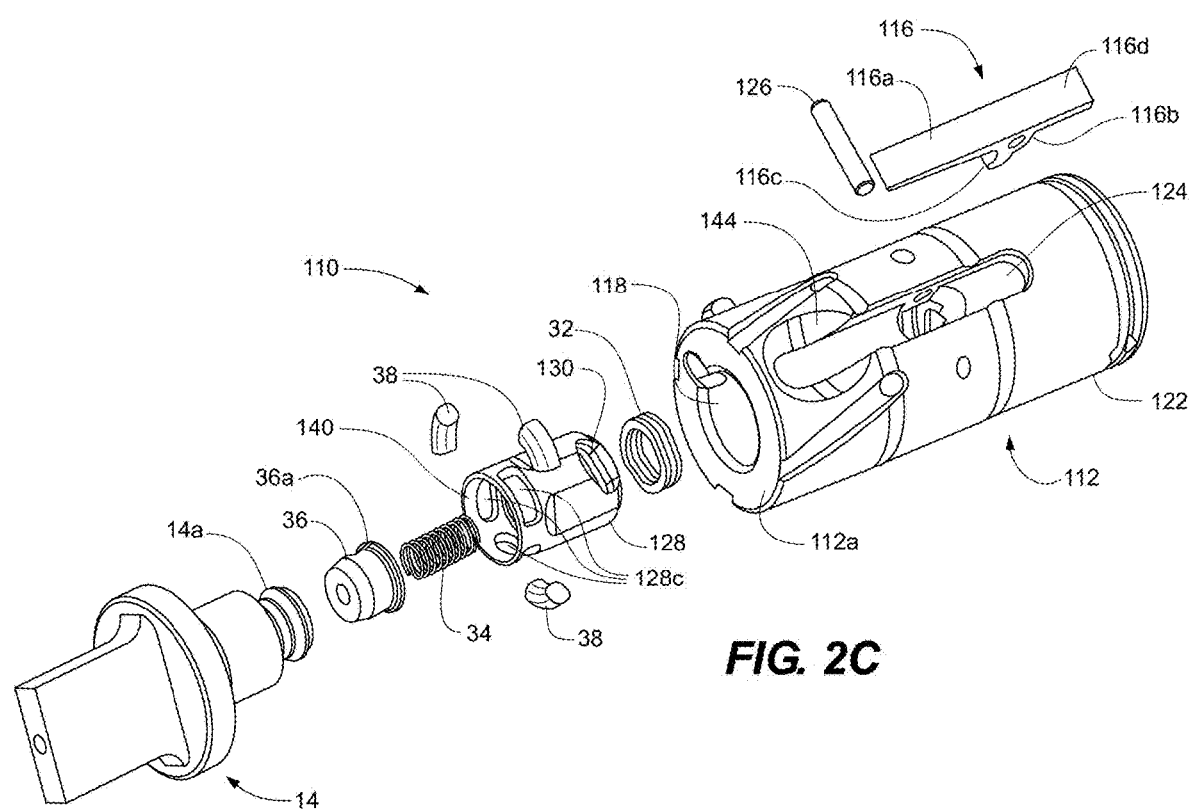
FIG. 2C is the punch assembly of FIG. 2A, shown in exploded assembly view in accordance with certain embodiments of the invention.

Shifting to FIGS. 2B and 2C, illustrating cross sectional and exploded assembly views, respectively, of the punch assembly 110, many of the structural distinctions (as compared to the punch assembly 10) relate to the punch body 112, the triggering mechanism 116, and related features. Starting with the punch body 112, it has a sidewall 122 defined with a central cavity 118, within which the punch tip 14 is secured to the body 112. The triggering mechanism 116, as shown, is configured to pass through an opening 120 in the punch body sidewall 122, and as such extend into the central cavity 118 of the punch body 112. As shown, in certain embodiments, the punch body sidewall 122 is defined with a channel 124 sized to hold the triggering mechanism 116, with the channel 124 further defining the opening 120, which fluidly communicates with the punch body central cavity 118. In certain embodiments as shown, the channel 124 is sized for the triggering mechanism 116 to be recessed therein when in its "non-actuated" position, as illustrated in FIGS. 2A and 2B. Consequently, by keeping the mechanism 116 within the channel 124 (and thus not affecting the punch body's profile), the punch assembly 110 is better equipped for use with punch guides, as already described.

Similar to the mechanism 16 of FIG. 1A, the triggering mechanism 116 is uniquely yet simply shaped so that when the mechanism 116 is moved, actuation of other ancillary components within the punch body 112 can be initiated. To that end, the mechanism is formed as a single, integral piece that is operably coupled to the punch body sidewall 122. As further shown relative to FIGS. 2B, 2C, and 2D, the triggering mechanism 116 is shaped as a lever, having arm portion 116a, elbow portion 116b, protruding portion 116c, and leg portion 116d. To that end, the elbow portion 116b is operably coupled to the punch body sidewall 122, e.g., via pin 126, such that the mechanism 116 is selectively rotatable about the pin 126 and relative to the punch body 112. As shown, the triggering mechanism 116 is coupled to the punch body sidewall 122 (with the arm portion 116a correspondingly oriented) to run parallel to a longitudinal axis B (see FIG. 2D) of the punch body 114. In designs including the channel 124 described above (defined in the punch body sidewall 122), in certain embodiments, the channel's length can also be correspondingly defined to extend parallel to the longitudinal axis B.

Another ancillary component of the retain/release system can involve a coupling mechanism held within the punch body 112 and directly linked to the triggering mechanism 116. In certain embodiments as shown, the coupling mechanism can include a carrier body 128. Said carrier body 128, with reference to FIGS. 2B and 2C, is inserted in the punch body central cavity 118 and is defined with a sidewall bore 130 that is configured to align with the opening 120 in the sidewall 122 of the punch body 112. As such, when inserted in the channel 124, the triggering mechanism 116 (and particularly, its protruding portion 116c) is configured to further pass through the opening 120 and into the carrier body bore 130. Similar to that already described for assembly 10 of FIG. 1A, this coupling of the carrier body 128 with the triggering mechanism 116 enables corresponding movement of the body 128 from movement of the mechanism 116.

Other ancillary components enabling the punch tip 14 to be alternately secured or released from the punch body 112, and including one or more of resilient member(s) (e.g., springs 32 and/or 34), a cap 36, and a plurality of wedge members 38, are similar to those already described for the assembly 10 of FIG. 1A. Thus, the description that follows regarding those components for the punch assembly 110 of FIG. 2A is limited.

Figure 2D:
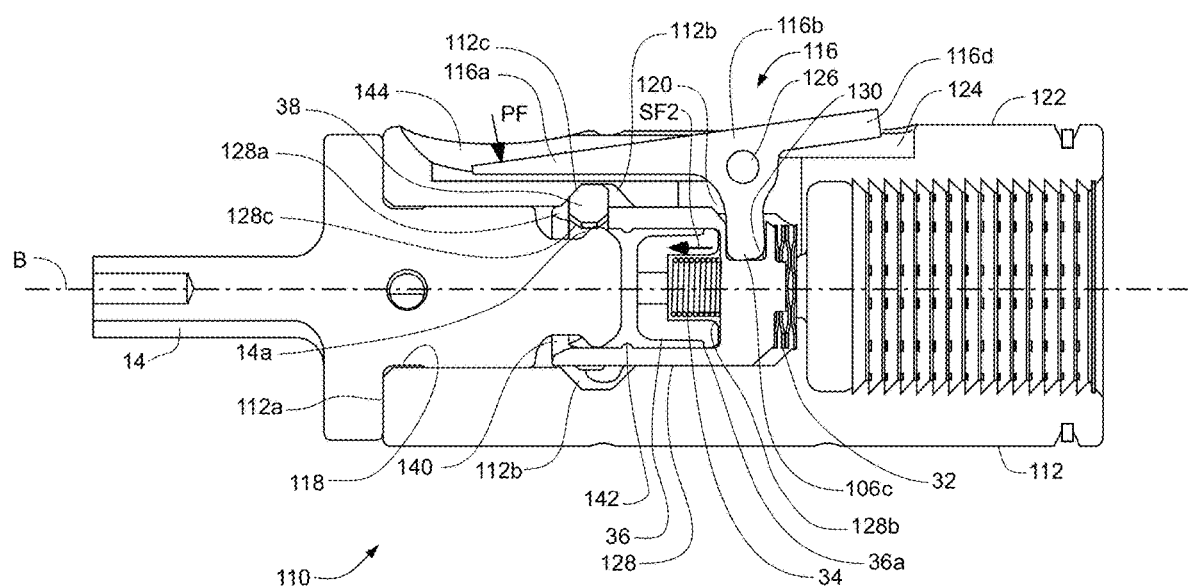
FIG. 2D is same view of the punch assembly shown in FIG. 2B, with triggering mechanism thereof shown in a release position in accordance with certain embodiments of the invention.
Figure 2A:
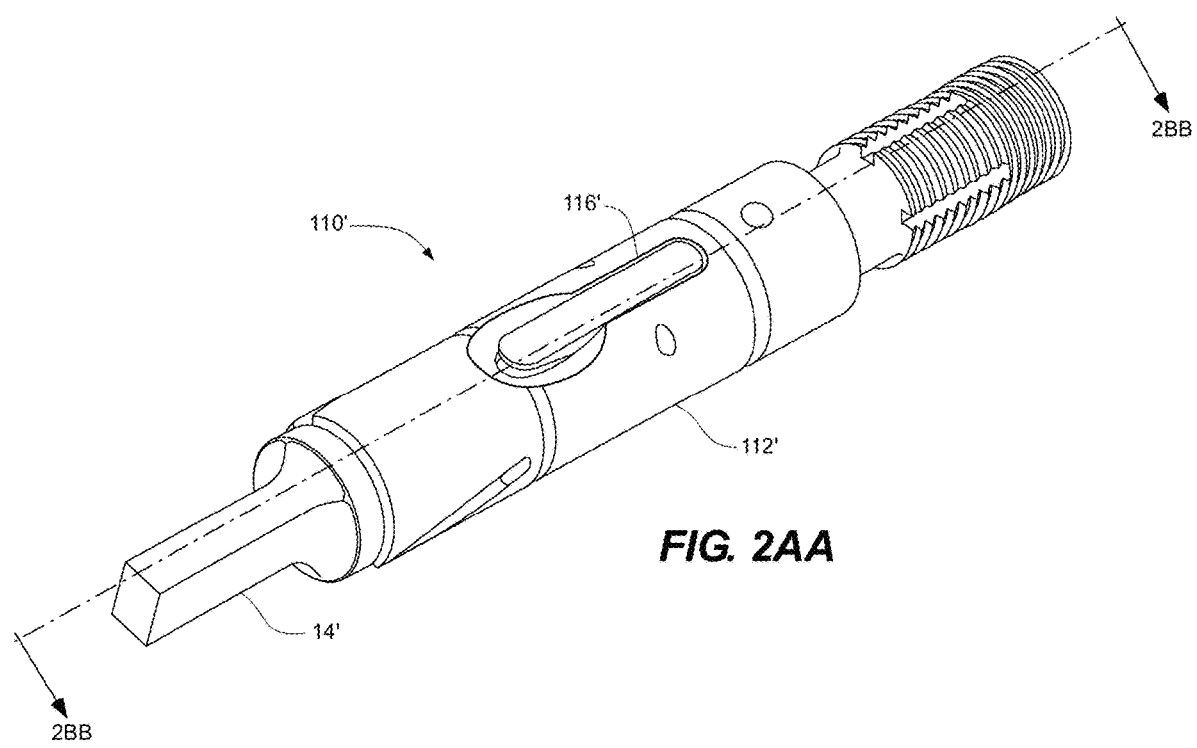
Figure 2B:
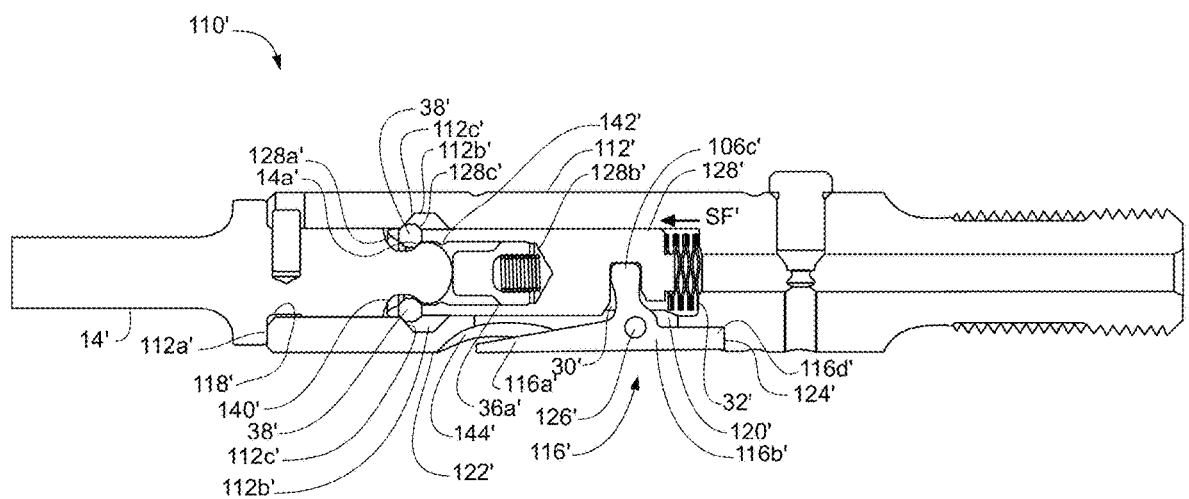
Figure 2C:
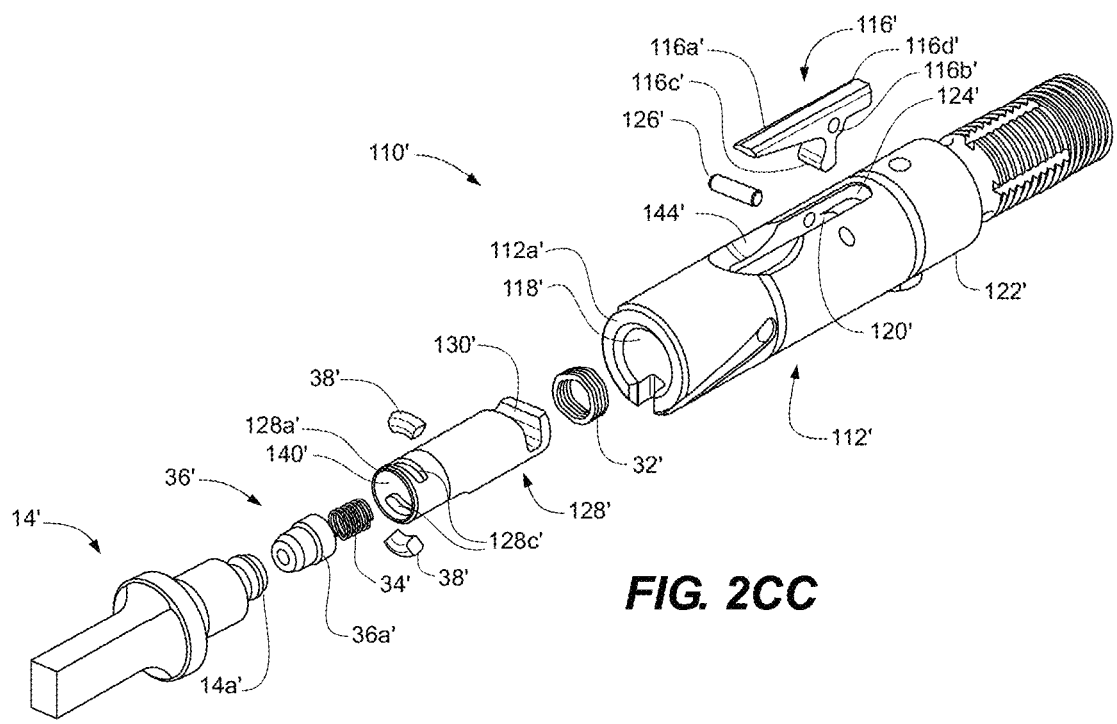
Figure 2D:
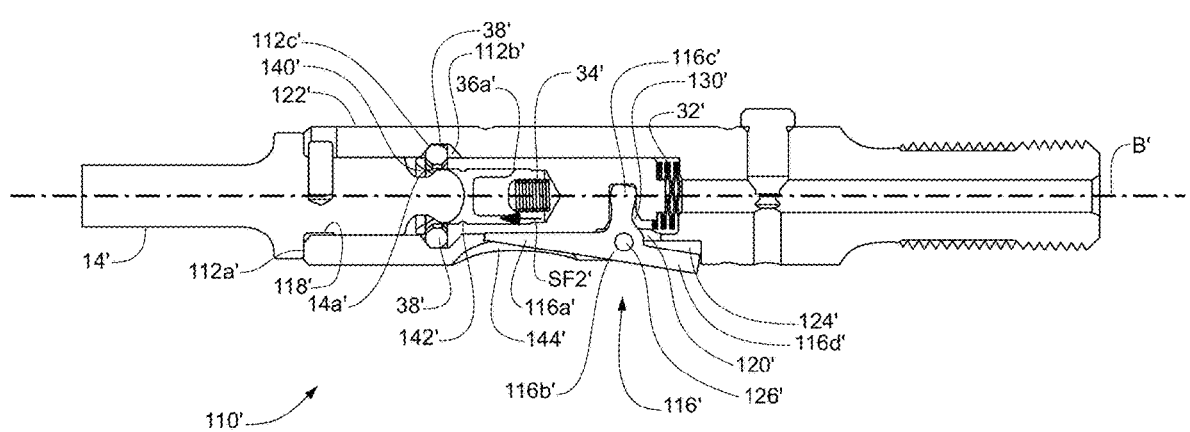

With reference to FIGS. 2B, 2C, and 2D, movement of the carrier body 128 is dictated via movement of the triggering mechanism 116 (and corresponding movement of the protruding portion 116c). In particular, as the arm portion 116a of the triggering mechanism 116 is pressed downward (at end opposite the elbow portion 116b), the protruding portion 116c is correspondingly pivoted inward relative to the punch body central cavity 118, such that the body 128 is correspondingly urged away from the front end 112a of the punch body 112 and to a deeper position in the cavity 118. Such deeper positioning of the carrier body 128 is perhaps best demonstrated in FIG. 2D, representing an "unlocked" (or "release") configuration for the punch body 112 relative to the punch tip 14. Conversely, as the triggering mechanism 116 is released (whereby the arm portion 116a is pulled back upward toward the punch body sidewall 122 via action of spring 32 on the carrier body 128), the protruding portion 116c is pivoted outward relative to the punch body central cavity 118. Correspondingly, the carrier body 128 is moved toward the front end 112a of the punch body 112 and to a shallower position in the punch body cavity 118. Such shallower positioning of the carrier body 128 is perhaps best demonstrated in FIG. 2B, representing a "locked" (or "retain") configuration for the punch body 112 relative to the punch tip 14. With the above as a backdrop, it should be appreciated why the triggering mechanism 116 is positioned parallel with the longitudinal axis B of the punch body 112, as levered movement of the mechanism 116 in line with that axis B enables the corresponding movement of the carrier body 128 along that axis B.

In summary, the triggering mechanism 116 is configured for its arm portion 116a to be pressed inward relative to the punch body sidewall 122 to actuate ancillary components of the retain/release system and provide "unlocked" condition for the punch body 112. It should be appreciated that the pressing action of the arm portion 116a is a toolless action, i.e., meaning no tool is required. To that end, the action can be easily performed, e.g., with a single finger of a user, with the arm portion 116a to be directed in single direction, i.e., in an inward direction relative to the punch body sidewall 122. In certain embodiments, as shown, the sidewall 122 is defined with a recess 144 to house the end of the arm portion 116a to be acted on and provide space for which the arm portion 116a (as well as a pressing finger) may occupy when the portion 116a is pressed. As further detailed below (and with reference to FIGS. 2B and 2C), the alternating movement (or positioning) of the carrier body 128 corresponds with securing or releasing the punch tip 14 with respect to the punch body 112.

Perhaps best illustrated in FIGS. 2B, 2C, and 2D, the wedge members 38 are positioned to align between a corresponding plurality of openings 128c in the carrier body 128 and corresponding groove 112b defined within the sidewall 122 of the punch body 112 (lying outer to the openings 128c) to correspondingly accommodate the members 38. In certain embodiments, at least three wedge members 38 are used, and the groove 112b is defined to be continuous around the inner surface of the sidewall 122. In certain embodiments, as shown, the openings 128c are at the front end 128a of the carrier body 128, and the openings 128c are defined equidistant about the circumference of the body's outer surface. As further detailed below (with continued reference to FIGS. 2B and 2D), movement of the carrier body 128 (via movement of the arm portion 116a) results in the wedge members 38 being correspondingly moved relative to the carrier body openings 128c and the groove 112a in the punch body sidewall 122.

For example, starting with FIG. 2B, the punch body 112 is shown with the punch tip 14 secured thereto. To that end, and as illustrated, the triggering mechanism 116 is in its "non-actuated" position, which corresponds with the punch body 112 being in a "locked" configuration relative to the punch tip 14. In certain embodiments, as shown, the leg portion 116d is in contact with the punch body sidewall 122 when the triggering mechanism 116 is in its "non-actuated" position, and the leg portion 116d is driven into such contact with the sidewall 122 via force SF from the spring 32 on the carrier body 128. Particularly, the spring force SF resiliently biases the triggering mechanism 116 to counteract pressing force PF applied to arm portion 116a (see FIG. 2D), so that, without lifting force PF being applied, the punch body 112 remains in the "locked" configuration. It should be appreciated that, with the resilient biasing of the triggering mechanism 116 via the spring force SF, there is a level of securement provided so that the punch body 112 remains in the "locked" configuration unless the arm portion 116a is intentionally depressed.

Continuing with FIG. 2B, in certain embodiments, the arm portion 116a extends generally parallel to the longitudinal axis B of the punch body 112 when in the "non-actuated" position. The angled relationship between the protruding portion 116c and the arm portion 116a (e.g., about 90°) enables the mechanism 116 to contact and hold the carrier body 128 within the punch body central cavity 118; however, the spring force SF urges the body 128 to its shallowest position in the punch body central cavity 118. In such position of the carrier body 128, the wedge members 38, as shown, are locked within the carrier body openings 128c between hub 14a of the punch tip 14 and walls 112c of inner groove 112b of the punch body sidewall 122. It should be appreciated that with the punch assembly 110 using particular components for securing and seating the punch tip 14 (such as the carrier body 128 and wedge members 38), whereby the triggering mechanism 116 is linked to the punch tip 14 in indirect fashion, there are aspects of separation in the designs relative to the triggering and seating functions, so as to limit potential crossover effects that can significantly impact the punch assembly's performance over its life.

Shifting to FIG. 2D, pressing force PF has been applied to the arm portion 116a of the triggering mechanism 116. Accordingly, the protruding portion 116c of the mechanism 116 is inwardly pivoted relative to the punch body central cavity 118, and via its contact with the carrier body 128, the body 128 is correspondingly urged inward relative to the cavity 118. This inward positioning of the body 128, while opposed by the spring force SF, correspondingly directs the carrier body openings 128c to align with deeper portions of the groove 112b of the punch body sidewall 122. Accordingly (and as shown), greater portions of the wedge members 38 are permitted to move from the carrier body openings 128c and into the groove 112b. To that end, while the punch tip 14 is shown as still being mounted to the punch body 112, the skilled artisan would appreciate that the punch tip 14 is about to be driven from the punch body 112 via contact from the cap 36 due to spring force SF2 from the spring 34. Subsequently held in position by the inner protrusion 142, the cap 36 would correspondingly suspend the wedge members 38 within the openings 128c and the groove 112b with the punch tip 14 removed.

To subsequently join and seat the punch tip 14 to the punch body 112, the user simply inserts the punch tip hub 14a back into the carrier body central cavity 140 without any action levied on the triggering mechanism 116. In certain embodiments, the hub 14a is inserted past the wedge members 38 until contacting the protrusion 142 in the cavity 140. Providing sufficient inward force on the punch tip 14, and in turn its hub 14a, correspondingly shifts the carrier body 28 further into the cavity 140, and against the spring 32. In certain embodiments, such inward force needs to be greater than the SF of the spring 32. From that already described, it should be appreciated that with the spring 32 being compressed, the triggering mechanism 116 is correspondingly rotated inward to its "actuated" position (via the linkage between the carrier body 128 and the protruding portion 116c of the mechanism 116). To that end, a subsequent release of the inward force on the punch tip 14 results in the triggering mechanism 16 rotating back to its "non-actuated" position (given the spring force SF acting on the carrier body 128 and the member 116), and the carrier body 128 would shift back to its shallower position in the punch body central cavity 118. Correspondingly, the wedge members 38 would be shifted out from the deeper portions of the groove 112b (via contact with surrounding walls of the carrier body 128 defining the openings 128c) and correspondingly shift back to their positions in the carrier body openings 128c and groove 112b as shown in FIG. 2B.

FIGS. 2AA-2DD, as referenced above, pertain to embodiments of a punch assembly 110' that is similar in design to the assembly 110 shown in FIGS. 2A-2D yet is provided in an "A" station configuration. As will be recognized, due to the different assemblies but also based on the design similarities, the reference numerals in FIGS. 2AA-2DD are provided as next iterations of the elements used in FIGS. 2A-2D. In general, the principal differences between the punch assemblies 110 and 110' are similar to those already noted relative to the punch assemblies 10 and 10' of FIGS. 1A and 1AA, respectively, and thus no further description is provided.

Figure 3A:
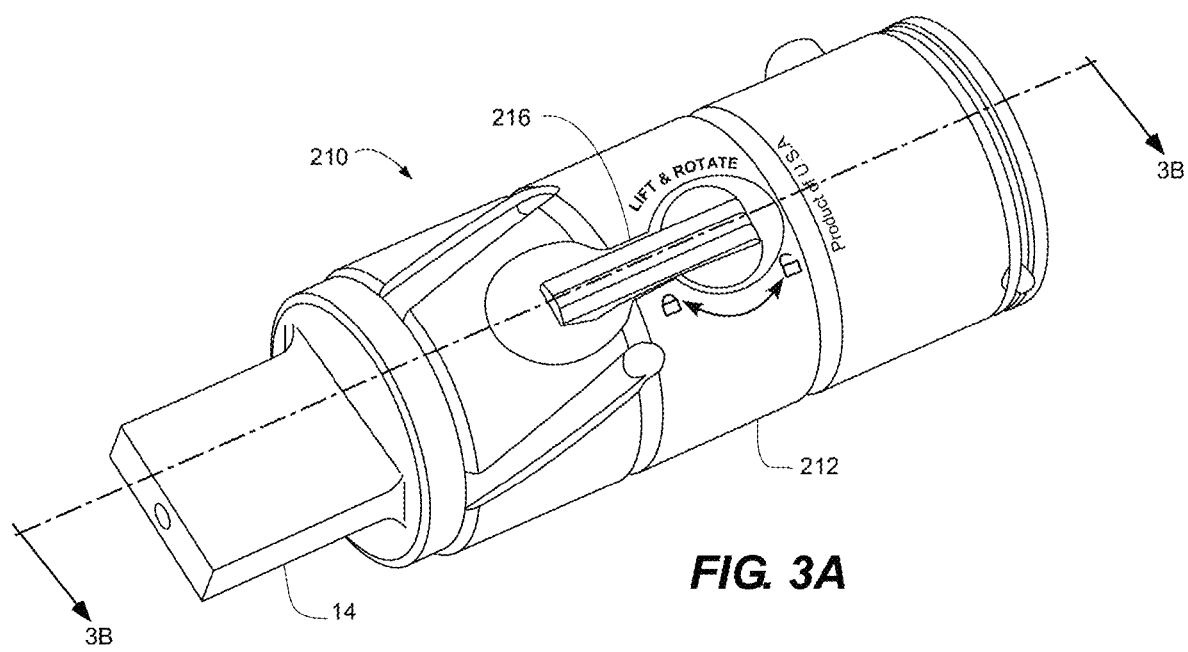
FIG. 3A is a perspective view of further punch assembly design provided in a first station configuration in accordance with certain embodiments of the invention.

FIG. 3A shows a perspective view of a further punch assembly 210 provided in a "B" station configuration according to certain embodiments of the invention. Like the punch assemblies 10 and 110 of FIGS. 1A and 2A, respectively, the punch assembly 210 is shown to include a punch body 212 with a triggering mechanism 216 used to actuate either securement or release of punch tip 14 relative to the body 212. To that end, the punch assembly 210 has similar features (with similar functions) to those already described for the punch assemblies 10 and 110. For example, like the mechanisms 16 and 116 of FIGS. 1A and 2A, respectively, the triggering mechanism 216 is operably coupled to the punch body 212, yet its coupling allows the mechanism 216 to be selectively moved relative to the punch body 212 and, via such movement, the mechanism 216 brings about condition for retaining or releasing the punch tip 14 relative to the punch body 212.

Figure 3B:
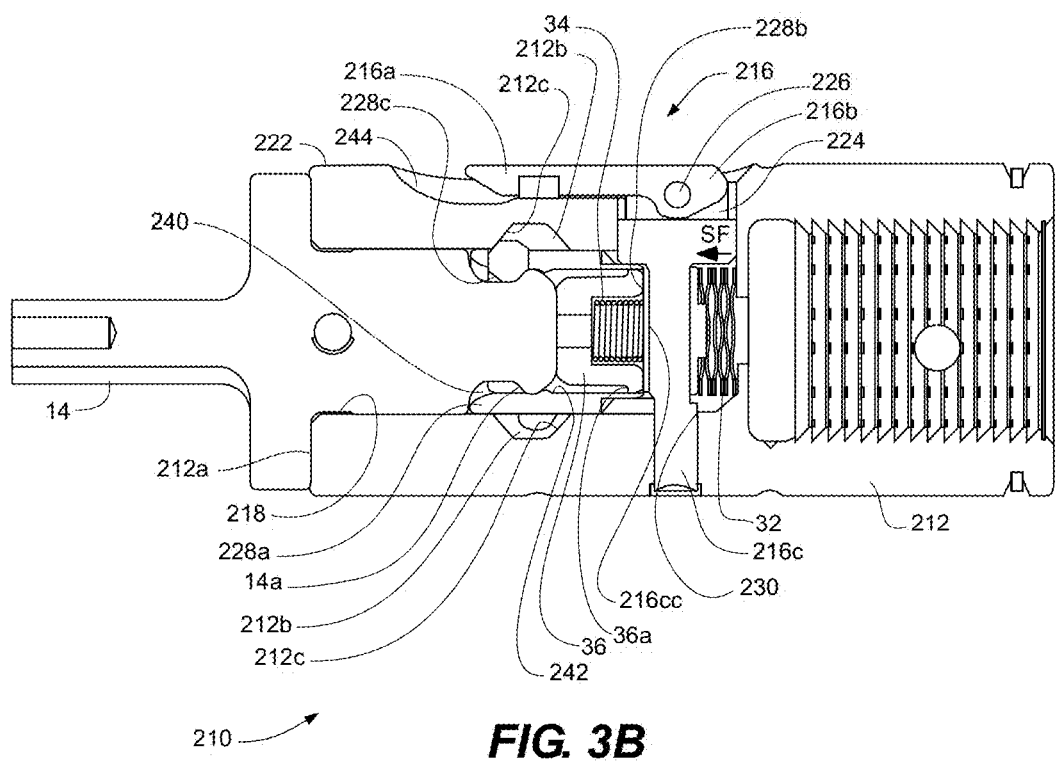
FIG. 3B is a side cross-sectional view of the punch assembly of FIG. 3A, taken along the line 3B-3B, in accordance with certain embodiments of the invention.
Figure 3C:
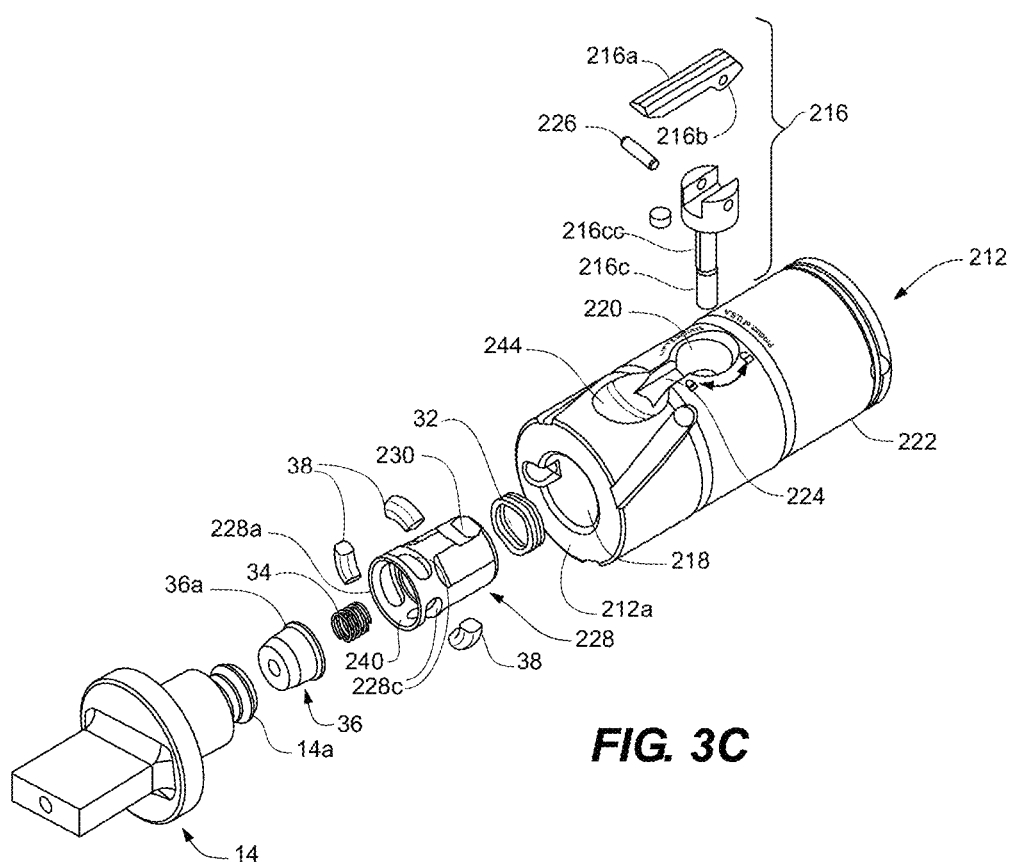
FIG. 3C is the punch assembly of FIG. 3A, shown in exploded assembly view in accordance with certain embodiments of the invention.

Shifting to FIGS. 3B and 3C, illustrating cross sectional and exploded assembly views, respectively, of the punch assembly 210, many of the structural distinctions (as compared to the punch assemblies 10 and 110) relate to the punch body 212, the triggering mechanism 216, and related features. Starting with the punch body 212, it has a sidewall 222 that defines a central cavity 218, within which the punch tip 14 is secured to the body 212. The triggering mechanism 216, as shown, is configured to pass through an opening 220 in the punch body sidewall 222, and as such extend into the central cavity 218 of the punch body 212. As shown, in certain embodiments, the punch body sidewall 222 is defined with a channel 224 sized to hold the triggering mechanism 216, with the channel 224 further defining the opening 220, which fluidly communicates with the punch body central cavity 218. In certain embodiments as shown, the channel 224 is sized for the triggering mechanism 216 to be recessed therein when in its "non-actuated" configuration, as illustrated in FIGS. 3A and 3B. Consequently, by keeping the mechanism 216 within the channel 224 (and thus not affecting the punch body's profile), the punch assembly 210 is better equipped for use with punch guides, as already described.

Similar to the mechanisms 16 and 116, the triggering mechanism 216 is uniquely shaped so that when the mechanism 216 is moved, actuation of other ancillary components within the punch body 212 can be initiated. For example, as shown relative to FIGS. 3B, 3C, and 3D, the triggering mechanism 216 is shaped as a joint clip/cam, having arm portion 216a, elbow portion 216b, and protruding portion 216c. To that end, the arm portion 216a and the protruding portion 216c are operably coupled at the elbow portion 216b, e.g., via pin 226, such that the arm portion 216a is selectively rotatable about the pin 226 and further twistable relative to the punch body 212 (and opening 220 thereof) so as to correspondingly rotate the protruding portion 216c. In certain embodiments as shown, the protruding portion 216c is shaped as a rod-like body, and is sized to extend from one side to the other side of the sidewall 122, resulting in uniform rigidity over the longitudinal extent of the protruding portion 116c when accommodated by the aperture 220. In certain embodiments, the leading end of the protruding portion 116c can be configured (e.g., internally threaded) to be operatively coupled (via threaded screw) to the other side of the sidewall 122, so as to secure the triggering mechanism 216 to the punch body 212, while also permitting rotation of the protruding portion 116c. It should be appreciated that a variety of coupling mechanisms could be used with that the leading end of the protruding portion 116c so as to couple the mechanism 216 to the sidewall 122 yet allow its rotation relative to the sidewall 122.

Another ancillary component of the retain/release system can involve a coupling mechanism held within the punch body 212 and directly linked to the triggering mechanism 216. In certain embodiments as shown, the coupling mechanism can include a carrier body 228. Said carrier body 228, with reference to FIGS. 3B and 3C, is inserted in the punch body central cavity 218 and is defined with a bore 230 that is configured to align with the opening 220 in the sidewall 222 of the punch body 212. As such, when inserted in the channel 224, the triggering mechanism 216 (and particularly, its protruding portion 216c) is configured to further pass through the opening 220 and into the carrier body bore 230. Similar to that already described for assemblies 10 and 110, this coupling of the carrier body 228 with the triggering mechanism 216 enables corresponding movement of the body 228 from movement of the mechanism 216.

Other ancillary components enabling the punch tip 14 to be alternately secured or released from the punch body 212, including one or more of resilient member(s) (e.g., springs 32 and/or 34), a cap 36, and a plurality of wedge members 38, are similar to those already described for the assemblies 10 and 110. Thus, the description that follows regarding those components for the punch assembly 210 of FIG. 3A is limited.

Figure 3D:
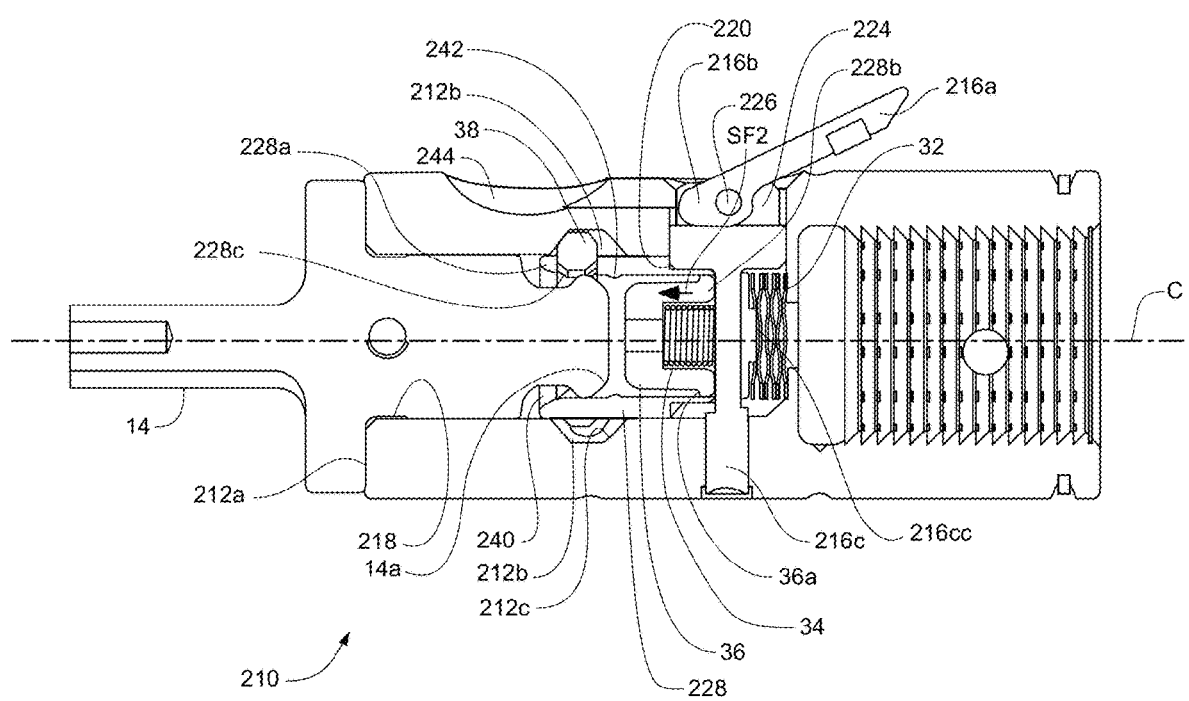
FIG. 3D is same view of the punch assembly shown in FIG. 3B, with triggering mechanism thereof shown in a release position in accordance with certain embodiments of the invention.
Figure 3A:
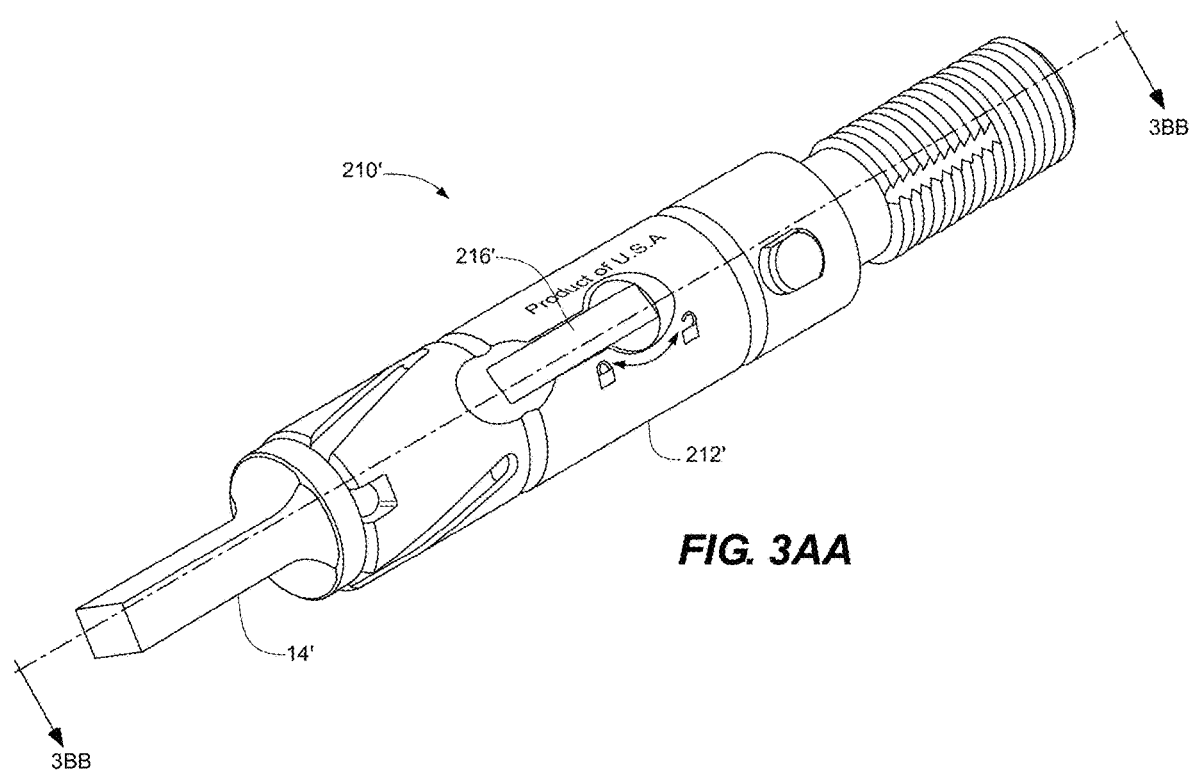
Figure 3B:
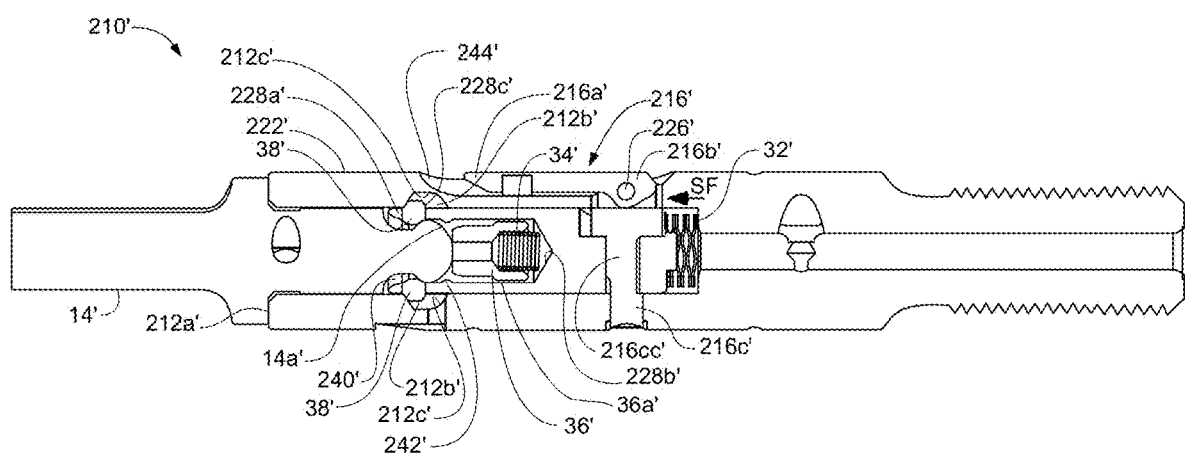
Figure 3C:
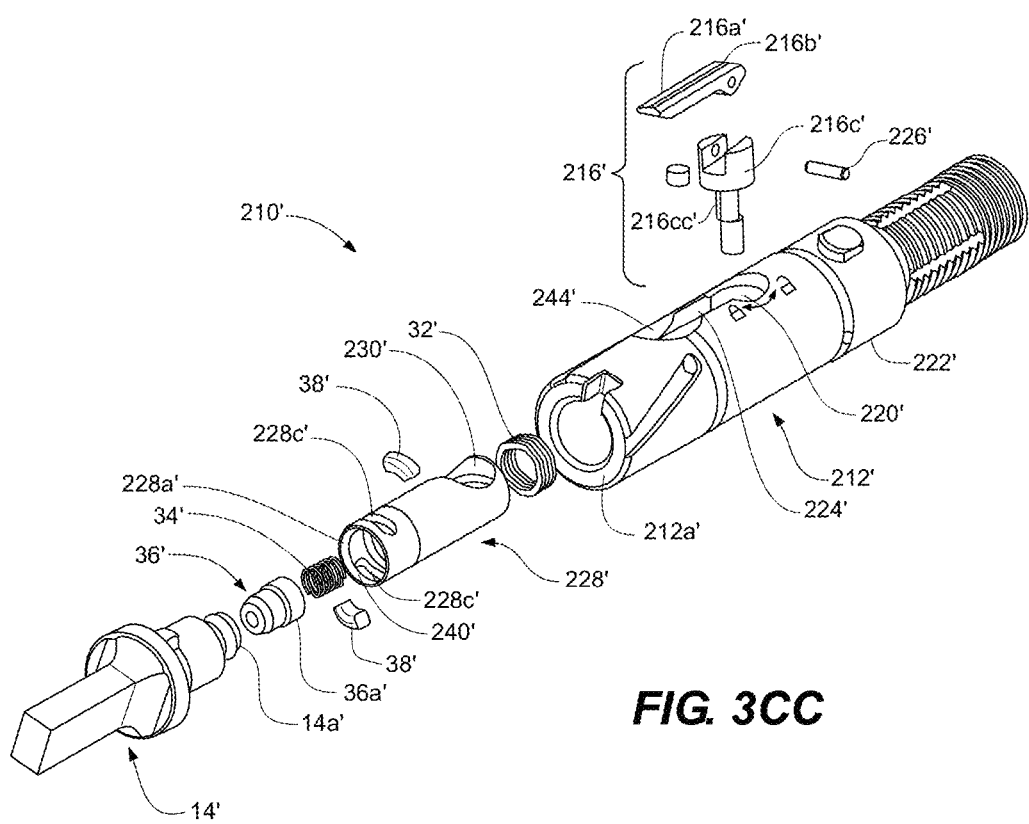
Figure 3D:
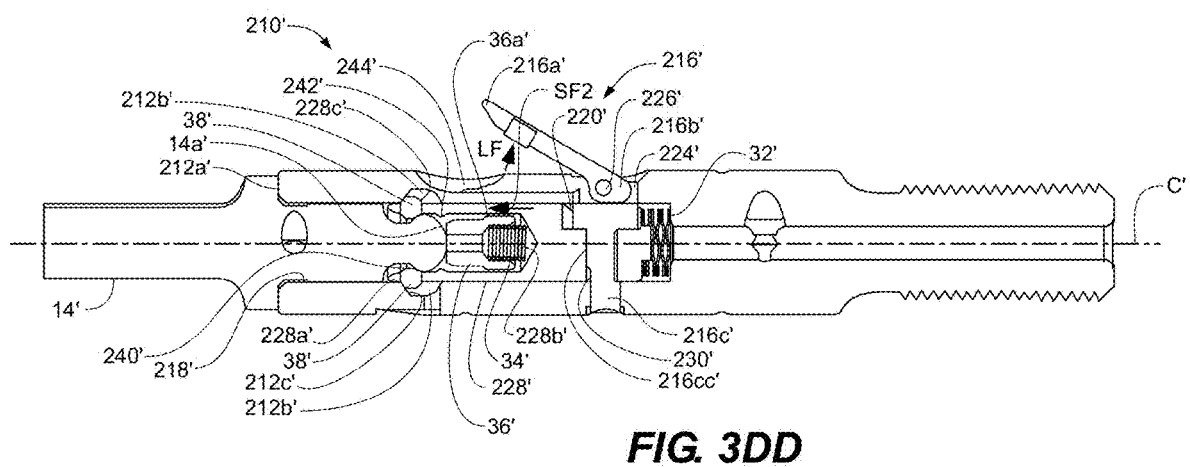

With reference to FIGS. 3B, 3C, and 3D, movement of the carrier body 228 is dictated via movement of the triggering mechanism 216 (and corresponding movement of the protruding portion 216c). In particular, the arm portion 216a of the triggering mechanism 216 is lifted (at end opposite the elbow portion 216b) and rotated to correspondingly rotate the protruding portion 216c relative to the punch body central cavity 218. With the rotation of the protruding portion 216c, a protruding side 216cc thereof is rotated toward the spring 32, so that the carrier body 228 is correspondingly urged away from the front end 212a of the punch body 212 and to a deeper position in the cavity 218. Such deeper positioning of the carrier body 228 is perhaps best demonstrated in FIG. 3D, representing an "unlocked" (or "release") configuration for the punch body 212 relative to the punch tip 14. Conversely, as the triggering mechanism 216 is reverted back to its "non-actuated" position (whereby the arm portion 216a is rotated and pressed back to its recessed configuration in sidewall channel 224), the protruding portion 216c is likewise rotated so that its protruding side 216cc is rotated away from the spring 32. Correspondingly, the carrier body 228 is moved toward the front end 212a of the punch body 212 and to a shallower position in the punch body cavity 218. Such shallower positioning of the carrier body 228 is perhaps best demonstrated in FIG. 3B, representing a "locked" (or "retain") configuration for the punch body 212 relative to the punch tip 14.

In summary, the triggering mechanism 216 is configured for its arm portion 216a to be lifted and rotated relative to the punch body sidewall 222 (to correspondingly rotate the protruding portion 216c) to actuate ancillary components of the retain/release system and provide "unlocked" condition for the punch body 212. It should be appreciated that the lifting and rotating actions of the arm portion 216a are toolless actions, i.e., meaning no tool is required. To that end, the actions can be easily performed, e.g., with finger and thumb of a user. In certain embodiments, as shown, the sidewall 222 is defined with a recess 244 to house the end of the arm portion 216a to be acted on and within which a person may insert a fingertip to scoop and lift the arm portion 216a.

The alternating movement (or positioning) of the carrier body 228 within the punch body central cavity 218 corresponds with securing or releasing the punch tip 14 with respect to the punch body 212, a process that has already been described with both punch bodies 12 and 112. Thus, the related description that follows regarding these components for the punch assembly 210 of FIG. 3A is limited. Perhaps best illustrated in FIGS. 3B, 3C, and 3D, the wedge members 38 are positioned to align between a corresponding plurality of openings 228c in the carrier body 228 and corresponding groove 212b defined within the sidewall 222 of the punch body 212 (lying outer to the openings 228c) to correspondingly accommodate the members 38. In certain embodiments, at least three wedge members 38 are used, and the groove 212b is defined to be continuous around the inner surface of the sidewall 222.

Starting with FIG. 3B, the punch body 212 is shown with the punch tip 14 secured thereto. To that end, and as illustrated, the triggering mechanism 216 is in its "non-actuated" position, which corresponds with the punch body 212 being in a "locked" configuration relative to the punch tip 14. In certain embodiments, as shown, the arm portion 216a is in contact with the punch body sidewall 222 when the triggering mechanism 216 is in its "non-actuated" position, with the arm portion 216a held within the channel 224. Continuing with the "non-actuated" position of the triggering mechanism 216, the spring force SF urges the carrier body 228 to its shallowest position in the punch body cavity 218. In such position of the carrier body 228, the wedge members 38, as shown, are locked within the carrier body openings 228c between hub 14a of the punch tip 14 and walls 212c of inner groove 212b of the punch body sidewall 222.

Shifting to FIG. 3D, the arm portion 216a of the triggering mechanism 216 has been lifted and rotated about the punch body 212 (e.g., in counterclockwise direction). Accordingly, the protruding portion 216c of the mechanism 216 is rotated relative to the spring 32, and via its corresponding compression of the spring 32 (via protruding side 216cc), the carrier body 228 is correspondingly urged inward relative to the cavity 218. This inward positioning of the body 228, while opposed by the spring force SF of the spring 32, correspondingly directs the carrier body openings 228c to align with deeper portions of the groove 212b of the punch body sidewall 222. Accordingly (and as shown), greater portions of the wedge members 38 are permitted to move from the carrier body openings 228c and into the groove 212b. To that end, while the punch tip 14 is shown as still being mounted to the punch body 212, the skilled artisan would appreciate that the punch tip 14 is about to be driven from the punch body 212 via contact from the cap 36 due to spring force SF2 from the spring 34. Subsequently held in position by the inner protrusion 242, the cap 36 would correspondingly suspend the wedge members 38 within the openings 228c and the groove 212b with the punch tip 14 removed.

To subsequently join and seat the punch tip 14 to the punch body 212, the user would need to lift and rotate the arm portion 216a (correspondingly rotating the protruding portion 216c), and subsequently insert the punch tip hub 14a into the carrier body central cavity 240 and be moved past the wedge members 38. To that end, in certain embodiments, the protrusion 242 can act as a stop for warranted insertion depth for the punch tip hub 14a. Or else, the cap 36 could bottom out in the carrier body cavity 240 (via the inward force from the punch tip 14), and that would serve as a stop for the punch tip hub 14a. By then rotating and pressing the arm portion 116a back into its sidewall recess, the carrier body 228 would be shifted back to its shallower position in the punch body central cavity 218. Correspondingly, the wedge members 38 would be shifted out from the deeper portions of the groove 212b via the carrier body openings 228c (and contact with surrounding walls of the carrier body 228 defining the openings 228c) and correspondingly shift back to their positions in the openings 228c and groove 212b as shown in FIG. 3B. It should be appreciated that punch assembly 210 requires initial actuation of its triggering mechanism 216 for punch tip 14 to be joined with the punch body 212, while the assemblies 10 and 110 of FIGS. 1A and 2A, respectively, do not require such actuation. To that end, each of the assemblies 10, 110, and 210 offer advantages, some being across the board and others being associated with one or more of the assemblies. For example, while requiring actuation for punch tip 14 to be joined, the punch assembly 210 also provides more protection than assemblies 10 and 110 against accidental punch tip release via incidental actuation of the triggering mechanism 216, as the assembly 210 dictates two separate actions (lifting and rotating) for such actuation.

FIGS. 3AA-3DD, as detailed above, pertain to embodiments of a punch assembly 210' that is similar in design to the assembly 210 shown in FIGS. 3A-3D yet is provided in an "A" station configuration. As will be recognized, due to the different assemblies but also based on the design similarities, the reference numerals in FIGS. 3AA-3DD are provided as next iterations of the elements used in FIGS. 3A-3D. Regarding principal differences between the punch assemblies 210 and 210', the punch assembly 210' has a longer extent, which corresponding increases the extents of many of its elements, including the punch body 212' and tip 14', as well as the carrier body 228' and the cap 36'. Also, the punch assembly 210' has a thinner profile, such that the quantity of wedge members 38' can be lessened (to quantity of two) while still providing effective securing and seating functions of the punch body 212' relative to the punch tip 14'. Additionally, the catch 36a' for the cap 36' (to hold the cap 36' to the carrier body 228') is located about midway up the cap's side wall (as opposed to bottom edge 36 for cap 36), in order to keep the cap 36' within the carrier body 28' via contact with the inner protrusion 242'. Finally, in FIG. 3DD, the punch assembly 210' is shown following initial lifting force LF used with arm portion 216a' of the triggering mechanism 216', yet the arm portion 216a' has not yet been rotated. Accordingly, the punch body 212' still looks to be in "locked" configuration relative to the punch tip 14. In sequentially looking to FIG. 3D, the punch assembly 210 is shown following rotation of the arm portion 216a, (and corresponding rotation of the protruding portion 216c), whereby the punch body 212 is placed in the "unlocked" configuration (as already described).

Figure 4:
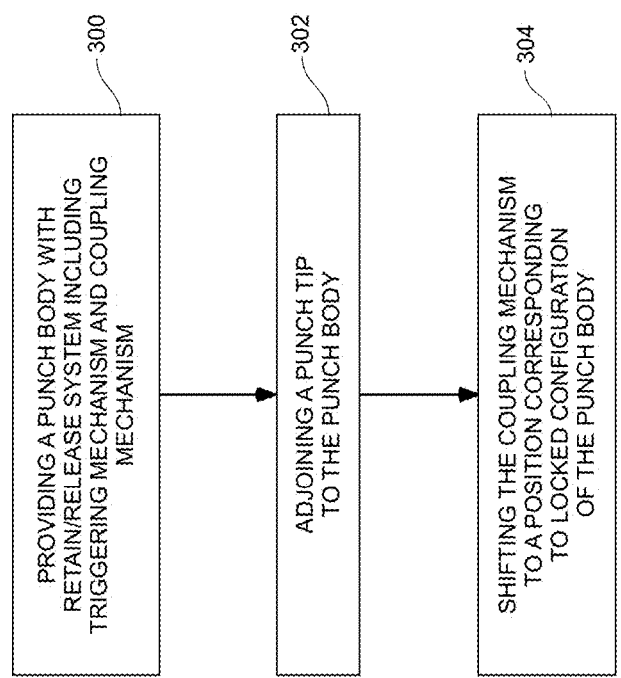
FIG. 4 is a flowchart of steps for securing a punch tip to a punch body for punch assemblies of FIGS. 1-3 according to certain embodiments of the invention.

FIG. 4 is a flowchart of steps for securing a punch tip to a punch body for a punch assembly, according to certain embodiments of the invention. It should be appreciated that the flowchart can relate to the punch bodies and punch tips illustrated in any of FIGS. 1A, 1AA, 2A, 2AA, 3A, and 3AA herein. However, the flowchart steps are exemplarily described with reference to the punch body 12, punch tip 14, and ancillary components shown in FIG. 1A.

Step 300 of the flowchart involves initially providing a punch body 12. Similar to that already detailed above, the punch body 12 defines a central cavity 18, which extends along a longitudinal extent of the punch body 12. The punch body 12 includes a retain/release system having a triggering mechanism 16, a coupling mechanism (carrier body 28), and a resilient member (e.g., spring 32). The carrier body 28 is seated within the punch body central cavity 18, with the triggering mechanism 16 coupling the punch body 12 and the carrier body 28 via aligned opening 20 and bore 30.

Step 302 involves readying the punch body 12 so a punch tip 14 can be joined thereto. For this step, the punch body 12 needs to be in its "unlocked" configuration, such that the coupling mechanism is in a first position within the punch body central cavity 18 and the wedge members 38 are unlocked within the cavity 18. Step 304 involves shifting the coupling mechanism to a position (i.e., second position) within the punch body cavity 18, such that wedge members 38 become locked within the cavity 18. To the end, the members 38 become locked within the openings 28c in the carrier body 28 and between the punch tip hub 14a and punch body side wall 22.

Further regarding steps 302 and 304, and in certain embodiments relative to punch assemblies of FIG. 1A (10) and FIG. 2A (110), there is no need to act upon the triggering mechanisms 16, 116. For example, and as already described for these punch assemblies, inward positioning of the punch tip 14 relative to the punch body 12, 112 (and its central cavity 18, 118) results in contact between the punch tip hub 14a and the carrier body 28, 128 (i.e., its inner protrusion 42, 142). Provided the force behind the inward movement of the punch tip 14 is greater than the spring force SF of the spring 32, the carrier body 28, 128 can be directed (from a first position) to a second position (i.e., inward, deeper position) within the punch body central cavity 18, 118 to unlock the wedge members 38. Thus, relative to step 302 for readying the punch body 12, 112 so a punch tip 14 can be joined thereto, the punch tip 14 is inwardly directed relative to the punch body 12, 112.

In turn, regarding step 304, and again relative to certain embodiments for the punch assemblies of FIG. 1A (10) and FIG. 2A (110), in shifting the coupling mechanism (carrier body 28, 128) to a position corresponding to the "locked" configuration of the punch body 12, 112, the force behind the inward movement of the punch tip 14 can simply be removed. With such release, the spring force SF of the spring 32 would automatically drive the carrier body 28, 128 (from the second position) to the first position (i.e., outward, shallower position) within the punch body central cavity 18, 118 to direct the wedge members 38 to become locked in position between punch tip hub 14a and punch body side wall 22, 122, and correspondingly lock the punch tip 14 to the punch body 12, 112.

Alternately, in certain embodiments relative to punch assembly of FIG. 3A (210), each of steps 302 and 304 would require acting upon the triggering mechanism 216. To that end, readying the punch body 212 so a punch tip 14 can be joined thereto (in step 302) can involve moving (lifting and rotating) the triggering mechanism 216 with finger and thumb to its "actuated" position, such that the coupling mechanism (carrier body 228) is directed (from a first position) to a second position (i.e., inward, deeper position) within the punch body central cavity 218 to unlock the wedge members 38. To that end, step 302 would subsequently include inserting the punch tip 14 into position in the punch body central cavity 218 (and correspondingly the carrier body central cavity 240) for being joined to the punch body 212. Relative to step 304, in shifting the coupling mechanism (carrier body 228) to a position corresponding to a "locked configuration" of the punch body 212, the triggering body 216 is simply moved back to its "non-actuated" position (via corresponding rotating and pressing actions). In turn, the carrier body 228 is directed (from the second position) back to the first position (i.e., outward, shallower position) within the punch body central cavity 218 to lock the wedge members 38 between punch tip hub 14a and punch body side wall 222, and correspondingly lock the punch tip 14 to the punch body 212.

In the foregoing detailed description, the invention has been described with reference to specific embodiments. However, it may be appreciated that various modifications and changes can be made without departing from the scope of the invention as set forth in the appended claims.

The invention claimed is:

1. A punch body comprising:
a sidewall that defines a central cavity, the central cavity extending along a longitudinal extent of the punch body; and
a retain/release system comprising a triggering mechanism, a coupling mechanism, and a resilient member, the triggering mechanism being accessible on the punch body sidewall and hand adjustable relative to the sidewall, the triggering mechanism coupling the punch body and the coupling mechanism, the resilient member within the punch body central cavity and positioned to resiliently oppose adjustment of the triggering mechanism;

wherein with force being applied to the triggering mechanism, the coupling mechanism is correspondingly configured to shift from a first position within the punch body central cavity to a second position corresponding to an unlocked configuration of the punch body with respect to a punch tip;
wherein the resilient member is configured to shift the coupling mechanism to the first position with removal of the force and the triggering mechanism back to a resiliently biased setting, said first position of the coupling mechanism corresponding to a locked configuration of the punch body with respect to the punch tip; and
wherein the triggering mechanism is shaped as a lever and operably coupled to the sidewall via a pin, the triggering mechanism rotatable about the pin, wherein rotation of the triggering mechanism via the force corresponds with a pivoting of a protruding portion of the triggering mechanism relative to the coupling mechanism.

2. The punch body of claim 1 wherein the triggering mechanism has an arm portion and a protruding portion, the arm portion configured to receive the finger force, which when applied corresponds with the protruding portion shifting the coupling mechanism and the resilient member being correspondingly compressed by the coupling mechanism within the punch body central cavity.

3. The punch body of claim 2 wherein the first position of the coupling mechanism is higher within the punch body central cavity than the second position.

4. The punch body of claim 2 wherein the punch body sidewall defines a channel within which the triggering mechanism is situated, wherein the channel includes a recess to accommodate a finger when directing the force onto the arm portion.

5. The punch body of claim 4 wherein the force is a lifting force, wherein the recess is sized to accept a fingertip for scooping and lifting the arm portion out from the recess.

6. The punch body of claim 1 wherein the triggering mechanism has an arm portion, the arm portion configured to receive the force, wherein the force is directed in a single direction.

7. The punch body of claim 1 wherein the triggering mechanism is positioned on the punch body sidewall to run parallel to a longitudinal axis of the punch body, shifting of the coupling mechanism also being parallel to the longitudinal axis.

8. The punch body of claim 1 wherein the resilient member is a spring.

9. The punch body of claim 1 wherein the coupling mechanism comprises a carrier body, the carrier body having a central cavity sized to release a hub of the punch tip when in the second position and sized to lock the punch tip hub when in the first position.

10. The punch body of claim 9 wherein the carrier body has a sidewall defined with a plurality of openings configured to carry a corresponding plurality of wedge members, the wedge members passing between the openings and a groove in the punch body sidewall when carrier body is moved from first position to second position and vice versa.

11. The punch body of claim 10 wherein the wedge members are fixed between walls of the carrier body openings and groove in the first position.

12. The punch body of claim 10 wherein the wedge members are free to move from the carrier body openings into the groove in the second position.

13. The punch body of claim 1 wherein the rotation of the triggering mechanism via the force corresponds with an inward pivoting of the protruding portion of the triggering mechanism relative to the coupling mechanism.

14. A punch body comprising:
a sidewall that defines a central cavity, the central cavity extending along a longitudinal extent of the punch body; and
a retain/release system comprising a triggering mechanism, a coupling mechanism, and a resilient member, the triggering mechanism being accessible on the punch body sidewall and hand adjustable relative to the sidewall, the triggering mechanism coupling the punch body and the coupling mechanism, the resilient member within the punch body central cavity underneath the coupling mechanism;
wherein the triggering mechanism has an arm portion and a protruding portion, the arm portion configured to receive one or more forces, which when applied correspond with the protruding portion shifting the coupling mechanism;
wherein the arm portion in a first position corresponds with the coupling mechanism being in a higher position within the punch body central cavity corresponding to a locked configuration of the punch body with respect to a punch tip;
wherein the arm portion in a second position corresponds with the coupling mechanism being in a lower position within the punch body central cavity corresponding to an unlocked configuration of the punch body with respect to a punch tip; and
wherein the triggering mechanism is shaped as a lever and operably coupled to the sidewall via a pin, the triggering mechanism rotatable about the pin, wherein rotation of the triggering mechanism via the force corresponds with a pivoting of a protruding portion of the triggering mechanism relative to the coupling mechanism.

15. The punch body of claim 14 wherein the arm portion is configured to move from the first position to the second position and vice versa via a single force on the arm portion.

16. The punch body of claim 15 wherein the force is directed in a single direction, and upon application, the coupling mechanism is shifted from the shallower position to the deeper position with the resilient member being correspondingly compressed by the coupling mechanism within the punch body central cavity.

17. The punch body of claim 16 wherein the resilient member is configured to shift the coupling mechanism to the shallower position with removal of the force from the triggering mechanism, the triggering mechanism being in a resiliently biased setting relative to the punch body sidewall.

18. The punch body of claim 15 wherein the punch body sidewall defines a channel within which the triggering mechanism is situated, wherein the channel includes a recess to accommodate a finger for directing the force onto the arm portion.

19. The punch body of claim 18 wherein the force is a lifting force, wherein the recess is sized to accept a fingertip for scooping and lifting the arm portion out from the recess.

20. The punch body of claim 18 where the force is a pushing force, where the recess is sized to accommodate the depressed arm portion.

21. The punch body of claim 14 wherein the coupling mechanism comprises a carrier body, the carrier body having a central cavity sized to release a hub of the punch tip when in the second position and sized to lock the punch tip hub when in the first position.

22. A method of securing a punch tip with a punch body, the method comprising:
(a) providing a punch body, the punch body having a sidewall that defines a central cavity extending along a longitudinal extent of the punch body, the punch body comprising a retain/release system including a triggering mechanism, a coupling mechanism, and a resilient member, the coupling mechanism seated within the punch body central cavity, the triggering mechanism coupling the punch body and the coupling mechanism;
(b) readying the punch body so a punch tip can be joined thereto, the triggering mechanism being shaped as a lever and operably coupled to the sidewall via a pin, the triggering mechanism rotatable about the pin, wherein rotation of the triggering mechanism via the force corresponds with a pivoting of a protruding portion of the triggering mechanism relative to the coupling mechanism; and
(c) shifting the coupling mechanism to a position corresponding to a locked configuration of the punch body.

23. The method of claim 22, wherein readying the punch body comprises inserting the punch tip in the punch body by hand with force sufficient to deflect the resilient member and shift the coupling mechanism from a first position within the punch body central cavity to a second position corresponding to an unlocked configuration of the punch body and proper position of the punch tip within the punch body to be secured thereto.

24. The method of claim 23, wherein shifting the coupling mechanism to a position corresponding to locked configuration of the punch body comprises releasing the hand force from the punch tip.

25. The method of claim 22 wherein readying the punch body comprises applying one or more forces to the triggering mechanism, whereby the coupling mechanism correspondingly shifts from a first position within the punch body central cavity to a second position corresponding to an unlocked configuration of the punch body.

26. The method of claim 25 wherein the triggering mechanism has an arm portion and a protruding portion, the arm portion configured to receive the one or more forces, which when applied corresponds with the protruding portion shifting the coupling mechanism and the resilient member being correspondingly compressed by the coupling mechanism within the punch body central cavity.

27. The method of claim 25 wherein the triggering mechanism has an arm portion and a protruding portion, the arm portion configured to receive the one or more finger forces, which when applied correspond with the protruding portion shifting the coupling mechanism;
wherein the arm portion in a first position corresponds with the coupling mechanism being in a higher position within the punch body central cavity corresponding to a locked configuration of the punch body with respect to a punch tip; and
wherein the arm portion in a second position corresponds with the coupling mechanism being in a lower position within the punch body central cavity corresponding to an unlocked configuration of the punch body with respect to a punch tip.

28. The method of claim 22 wherein the coupling mechanism comprises a carrier body, the carrier body defined with a plurality of openings each defined to accommodate one of a plurality of wedge members, and wherein the shifting of the carrier body within the punch body central cavity results in the wedge members moving relative to a corresponding groove defined in an inner surface of the punch body sidewall.

\* \* \* \* \*